(12) United States Patent
Wu et al.

(10) Patent No.: US 12,377,534 B1
(45) Date of Patent: Aug. 5, 2025

(54) MOBILE ROBOT, OPERATION SYSTEM, CONTROL METHOD, AND CONTROL SYSTEM FOR ASSEMBLING BATTERY

(71) Applicant: CONTEMPORARY AMPEREX TECHNOLOGY (HONG KONG) LIMITED, Hong Kong (CN)

(72) Inventors: Kai Wu, Ningde (CN); Zenghui Chen, Ningde (CN); Yudong Qiu, Ningde (CN); Bin Zhao, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 19/185,274

(22) Filed: Apr. 22, 2025

Related U.S. Application Data

(63) Continuation of application No. PCT/CN2023/135039, filed on Nov. 29, 2023.

(30) Foreign Application Priority Data

Oct. 13, 2023 (CN) .......................... 202311323850.0

(51) Int. Cl.
*B25J 9/00* (2006.01)
*B25J 5/00* (2006.01)
(Continued)

(52) U.S. Cl.
CPC ............. *B25J 9/0009* (2013.01); *B25J 9/162* (2013.01); *B25J 9/1697* (2013.01); *B25J 19/023* (2013.01); *H01M 10/0404* (2013.01); *B25J 5/007* (2013.01)

(58) Field of Classification Search
CPC ........ B25J 9/0009; B25J 9/162; B25J 9/1697; B25J 19/023; B25J 5/007; H01M 10/0404
See application file for complete search history.

(56) References Cited

FOREIGN PATENT DOCUMENTS

| CN | 106058293 A | 10/2016 |
|----|-------------|---------|
| CN | 107243622 A | 10/2017 |

(Continued)

OTHER PUBLICATIONS

Rapid Changing Device Integrated Intelligent Mobile Robot, Has Rapid-change Platform Provided With Rapid Change Clamp That Is Connected With Multiple Clamp Bodies, And Movable Chassis Connected to Automatic Mobile Chassis (Year: 2018).*

(Continued)

*Primary Examiner* — Basil T. Jos
(74) *Attorney, Agent, or Firm* — XSENSUS LLP

(57) ABSTRACT

Embodiments of this disclosure provide a mobile robot for assembling a battery, an operation system, a control method, and a control system. The mobile robot includes a mobile platform, an inspection apparatus, a plurality of end effectors, and a robotic hand. The mobile platform is capable of receiving an assembly instruction to implement movement between different positions. The inspection apparatus is disposed on the mobile platform, configured to obtain a position signal and an assembly recipe signal. The plurality of end effectors are placed on the mobile platform. The robotic hand is disposed on the mobile platform, capable of connecting to a target end effector to perform a corresponding assembly action on the battery. The target end effector is determined from the plurality of end effectors based on the assembly instruction, and the assembly action is determined based on the position signal and the assembly recipe signal.

20 Claims, 9 Drawing Sheets

(51) Int. Cl.
*B25J 9/16* (2006.01)
*B25J 19/02* (2006.01)
*H01M 10/04* (2006.01)

(56) References Cited

FOREIGN PATENT DOCUMENTS

| | | | |
|---|---|---|---|
| CN | 107253084 A | | 10/2017 |
| CN | 207807706 U | * | 9/2018 |
| CN | 109454622 A | | 3/2019 |
| CN | 110555271 A | | 12/2019 |
| CN | 210150252 U | | 3/2020 |
| CN | 111390957 A | | 7/2020 |
| CN | 216913818 U | | 7/2022 |
| CN | 114952774 A | | 8/2022 |
| CN | 115092671 A | | 9/2022 |
| CN | 115689094 A | | 2/2023 |
| CN | 218776585 U | | 3/2023 |
| CN | 117047744 A | | 11/2023 |
| JP | H05-038690 A | | 2/1993 |
| JP | H08-118276 A | | 5/1996 |
| JP | H10-244431 A | | 9/1998 |
| JP | 2012-035391 A | | 2/2012 |

OTHER PUBLICATIONS

International Search Report and Written Opinion mailed on Jun. 28, 2024, received for International Application No. PCT/CN2023/135039, filed on Nov. 29, 2023, 16 pages with English translation.
First Office Action of the Chinese application No. 202311323850.0, issued on Nov. 21, 2023, 33 pages with English translation.
Second Office Action of the Chinese application No. 202311323850.0, issued on Dec. 18, 2023, 36 pages with English translation.

* cited by examiner

MOBILE ROBOT, OPERATION SYSTEM, CONTROL METHOD, AND CONTROL SYSTEM FOR ASSEMBLING BATTERY

CROSS-REFERENCE TO RELATED APPLICATIONS

This disclosure is a continuation of International Application No. PCT/CN2023/135039, filed on Nov. 29, 2023, which claims priority to Chinese Patent Application No. 202311323850.0, filed on Oct. 13, 2023 and entitled "MOBILE ROBOT, OPERATION SYSTEM, CONTROL METHOD, AND CONTROL SYSTEM FOR ASSEMBLING BATTERY", each are incorporated herein by reference in their entirety.

TECHNICAL FIELD

This disclosure relates to the field of battery assembly technologies, and in particular, to a mobile robot, an operation system, a control method, and a control system for assembling a battery.

BACKGROUND

New energy batteries are increasingly used in life and industry, for example, electric vehicles equipped with batteries have been widely used, and batteries are also increasingly used in the field of energy storage.

In related technologies, battery assembly includes multiple assembly procedures, some or all of which are assisted by corresponding robotic hands. Because the products and assembly actions corresponding to various procedures are different, a single robotic hand cannot complete the assembly actions for multiple assembly procedures, failing to meet the requirements of high precision, high flexibility, and high efficiency in assembly.

SUMMARY

In view of this, embodiments of this disclosure aim to provide a mobile robot, an operation system, a control method, and a control system for assembling a battery to solve the technical problem in related technologies where a single robotic hand cannot complete the assembly actions for multiple assembly procedures and fail to meet the requirements of high precision, high flexibility, and high efficiency in assembly.

To achieve the above purpose, according to a first aspect, an embodiment of this disclosure provides a mobile robot for assembling a battery, including:
 a mobile platform, capable of receiving an assembly instruction to implement movement between different positions;
 an inspection apparatus, disposed on the mobile platform, configured to obtain a position signal and an assembly recipe signal;
 a plurality of end effectors, placed on the mobile platform; and
 a robotic hand, disposed on the mobile platform and capable of connecting to a target end effector to perform a corresponding assembly action on the battery; where the target end effector is determined from the plurality of end effectors based on the assembly instruction, and the assembly action is determined based on the position signal and the assembly recipe signal.

In this embodiment, the inspection apparatus obtains the position signal and the assembly recipe signal. According to the obtained position signal and assembly recipe signal, the mobile platform drives the robotic hand and the plurality of end effectors to move between different positions. The robotic hand can select and connect to the corresponding end effector according to the assembly instruction, and then perform the assembly action corresponding to the assembly instruction. The mobile robot for assembling a battery can select different end effectors to implement multiple different assembly actions, thereby being applicable to assembly actions for multiple procedures or different products, thus improving the versatility and adaptability of the mobile robot, reducing production costs while improving production efficiency and quality, which can meet the requirements of high precision, high flexibility, and high efficiency in assembly.

In some embodiments, the mobile platform includes a mobile chassis and a tool rack, where the mobile chassis has a work platform, and the tool rack is disposed on the work platform, where the plurality of end effectors are placed on the tool rack.

The mobile chassis implements movement between different positions, and the mobile chassis may be an automated guided vehicle (Automated Guided Vehicle, AGV). The tool rack limits the end effectors, facilitating the connection between the robotic hand and the end effectors.

In some embodiments, the work platform is provided with a positioning member and configured for placing a material tray, so that the end effectors on the robotic hand is able to obtain materials from the material tray for assembly, speeding up the assembly rhythm and thereby improving the production rhythm.

The positioning member is configured to position the material tray on the work platform and limit the displacement of the material tray within the plane of the work platform, facilitating the end effectors on the robotic hand to obtain materials from the material tray. At the same time, since the material tray can hold multiple materials, the robotic hand does not need to frequently obtain materials from the material library, improving the production rhythm.

In some embodiments, the robotic hand includes a multi-joint arm and a quick-change mechanism, where the multi-joint arm is disposed on the mobile platform to implement assembly actions in multiple directions, and the quick-change mechanism is connected to an end of the multi-joint arm for quick-change connection with the plurality of end effectors.

The quick-change mechanism can quickly connect or quickly separate the robotic hand and the end effector without manual intervention, thereby facilitating the replacement of the end effector.

In some embodiments, the inspection apparatus includes a global camera, an end camera, and a light source, where the global camera is disposed on the mobile platform and configured to obtain assembly environment information, the end camera is disposed at an end of the robotic hand to obtain the assembly recipe signal, and the light source is disposed adjacent to the end camera to provide lighting for image capturing by the end camera.

The global camera is disposed on the mobile platform and remains fixed in position relative to the mobile platform, capable of obtaining assembly environment information by image capturing, where the information is further used to obtain the position of the mobile platform. The end camera is disposed at the end of the robotic hand and can move with the robotic hand to obtain the assembly recipe signal corresponding to the battery. The light source provides lighting for image capturing by the end camera to improve the clarity of the captured image.

In some embodiments, the inspection apparatus further includes a rangefinder, disposed on the mobile platform to obtain a precise position signal of the mobile platform.

The rangefinder precisely positions the mobile platform, improving the accuracy of the position signal of the mobile platform.

In some embodiments, the rangefinder is disposed in different orientations on the mobile platform.

Thus, each rangefinder can obtain position information in the corresponding orientation, thereby the precise positions of the mobile platform in multiple directions can be obtained, improving operational safety.

In some embodiments, two rangefinders are disposed on each of the three sides of the mobile platform.

With two rangefinders disposed on each of the three sides, the positioning accuracy in the orientations that the three sides are facing can be improved.

In some embodiments, the plurality of end effectors include a gripper mechanism, a suction cup mechanism, and a screw-locking mechanism, where the gripper mechanism is configured to grasp a plug to test the battery; the suction cup mechanism is configured to suction a material tray for material loading, or suction foam, or suction a label; and the screw-locking mechanism is configured to suction a bolt from the material tray located on the mobile platform for assembly.

The structure of the gripper mechanism is not limited and can be adjusted according to the structure of the plug.

The suction cup mechanism has a suction function and can suction a material tray, foam, or a label. The material tray is configured to buffer materials required for assembly, such as bolts. The foam is configured to be placed between adjacent battery cells or adjacent battery modules, with advantages such as being easily compressed, lightweight, and high-temperature resistant. The label is configured to number the battery cells or battery modules.

The screw-locking mechanism has the function of suctioning bolts and assembling bolts, capable of suctioning bolts from the material tray and tightening the bolts on the battery to achieve screw-locking assembly.

According to a second aspect, an embodiment of this disclosure provides an operation system for assembling a battery, including:
  an assembly platform, configured to assemble the battery;
  a plurality of auxiliary devices, configured to provide different materials for assembling the battery; and
  the mobile robot according to any one of the above embodiments, capable of acquiring position information relative to the auxiliary devices, and obtaining materials from the plurality of auxiliary devices to assemble the battery on the assembly platform.

The mobile robot connects with the corresponding end effectors to obtain materials from different auxiliary devices to perform assembly actions on the battery, capable of adapting to various procedures and assembly actions of various products, improving the range of adaptation and versatility, and reducing production costs while improving production efficiency and quality, which can meet the requirements of high precision, high flexibility, and high efficiency in assembly.

In some embodiments, the plurality of auxiliary devices include:
  a bolt feeder, configured to provide a bolt;
  a foam peeler, configured to provide foam; and
  a label peeler, configured to provide a label.

The bolt feeder provides bolts, where the bolts are configured to fasten adjacent assembly parts. The foam peeler provides foam, where the foam is configured to be placed between adjacent battery cells or adjacent battery modules. The label peeler provides labels, where the labels are configured to number battery cells or battery modules.

According to a third aspect, an embodiment of this disclosure provides a control method for assembling a battery, applied to the mobile robot according to any one of the above embodiments, including:
  determining a target end effector from the plurality of end effectors based on an assembly instruction;
  controlling the robotic hand to connect to the target end effector; and
  based on a position signal and an assembly recipe signal obtained by the inspection apparatus, controlling the target end effector on the robotic hand to assemble the battery.

Thus, the mobile robot can select different end effectors to implement different assembly tasks, thereby being applicable to assembly actions for different procedures and different products, thus improving the versatility and adaptability of the mobile robot, and reducing production costs while improving production efficiency and quality, which can meet the requirements of high precision, high flexibility, and high efficiency in assembly.

In some embodiments, the control method further includes: determining a target auxiliary device from a plurality of auxiliary devices based on the assembly instruction; and based on a first position signal obtained by the inspection apparatus, controlling the mobile platform to move from an initial position to a position corresponding to the target auxiliary device.

Thus, based on the assembly instruction and the first position signal, the mobile platform is controlled to accurately move to the pending-assembly station, allowing the robotic hand to accurately and timely obtain materials from the pending-assembly station to complete the battery assembly, thereby improving assembly efficiency and safety.

In some embodiments, the control method further includes: determining relative position information between the mobile robot and the target auxiliary device based on a second position signal obtained by the inspection apparatus, and storing the relative position information into a preset database.

Thus, the precise position information of the mobile robot relative to the pending-assembly station is obtained through secondary positioning, improving the operational accuracy and safety of the mobile robot.

In some embodiments, the controlling the robotic hand to connect to the target end effector includes: determining a position of the target end effector based on a first image obtained by the inspection apparatus that contains the plurality of end effectors; and moving the robotic hand to the position of the target end effector to connect the robotic hand with the target end effector.

Thus, the position of the target end effector is located in real time by using the image obtained by the inspection apparatus, improving the accuracy of the position of the target end effector, thereby enhancing operational efficiency and safety.

In some embodiments, the based on a position signal and an assembly recipe signal obtained by the inspection apparatus includes, controlling the target end effector on the robotic hand to assemble the battery includes: determining an assembly procedure based on the assembly recipe signal obtained by the inspection apparatus; and according to the assembly procedure and based on the position signal obtained by the inspection apparatus, controlling the target end effector on the robotic hand to assemble the battery.

Thus, the assembly procedure is determined in real time by using the assembly recipe signal obtained by the inspection apparatus, and manual operation of the assembly procedure is not required, which not only improves the accuracy of the assembly procedure but also reduces labor costs, thereby enhancing assembly efficiency and increasing the automation rate of the production line.

In some embodiments, in a case that the assembly procedure includes a plugging procedure, the position signal includes a position signal of a plug and a position signal of a socket, the target end effector includes a gripper mechanism, and the assembly includes testing; and the based on the position signal obtained by the inspection apparatus, controlling the target end effector on the robotic hand to assemble the battery includes: based on the position signal of the plug obtained by the inspection apparatus, controlling the gripper mechanism on the robotic hand to grasp the plug; and based on the position signal of the socket obtained by the inspection apparatus, controlling the gripper mechanism on the robotic hand to insert the plug into the socket to perform a test on the battery.

Thus, the plug and the socket are located in real time by using the position signals obtained by the inspection apparatus, enabling the mobile robot to accurately and timely perform the plugging procedure. Compared to manually performing the plugging procedure, this not only improves the efficiency of completing the plugging task but also reduces labor costs.

In some embodiments, the control method further includes: controlling the gripper mechanism on the robotic hand to pull out the plug from the socket and move the plug to a set position in response to completion of the battery test.

Thus, the robotic hand restores the plug to the initial position, facilitating the robotic hand to perform the next plugging procedure.

In some embodiments, in a case that the assembly procedure includes a screw-locking procedure, the position signal includes a position signal of a bolt tray on the bolt feeder and a position signal of a bolt hole, and the target end effector includes a suction cup mechanism and a screw-locking mechanism; and the based on the position signal obtained by the inspection apparatus, controlling the target end effector on the robotic hand to assemble the battery includes: based on the position signal of the bolt tray obtained by the inspection apparatus, controlling the suction cup mechanism on the robotic hand to replace a material tray on the mobile platform with the bolt tray; replacing the suction cup mechanism on the robotic hand with the screw-locking mechanism, and controlling the screw-locking mechanism on the robotic hand to suction a bolt from the bolt tray; and based on the position signal of the bolt hole obtained by the inspection apparatus, controlling the screw-locking mechanism on the robotic hand to assemble the bolt into the bolt hole.

Thus, the bolt and the bolt hole are located in real time by using the position signals obtained by the inspection apparatus, enabling the mobile robot to accurately and timely perform the screw-locking procedure. Compared to manually performing the screw-locking procedure, this not only improves the efficiency of completing the screw-locking task but also reduces labor costs.

In some embodiments, in a case that the assembly procedure includes a material pasting procedure, the position signal includes a position signal of a target material in the target auxiliary device and a position signal of a pasting region, the target end effector includes a suction cup mechanism, and the assembly includes pasting; and the based on the position signal obtained by the inspection apparatus, controlling the target end effector on the robotic hand to assemble the battery includes: based on the position signal of the target material obtained by the inspection apparatus, controlling the suction cup mechanism on the robotic hand to suction the target material; and based on the position signal of the pasting region obtained by the inspection apparatus, controlling the suction cup mechanism on the robotic hand to paste the target material to the pasting region; where the target material includes one of the following: foam and a label.

Thus, the material to be operated is located in real time by using the position signal obtained by the inspection apparatus, enabling the mobile robot to accurately and timely perform the material pasting procedure. Compared to manually performing the material pasting procedure, this not only improves the efficiency of completing the material pasting task but also reduces labor costs.

In some embodiments, the control method further includes: in response to completion of the assembly procedure of the battery, controlling the robotic hand to move to a position corresponding to the target end effector to separate the robotic hand from the target end effector; and controlling the mobile platform to move to the initial position.

Thus, on the one hand, the robotic hand restores the target end effector to the corresponding position, facilitating the robotic hand to perform the next assembly procedure; on the other hand, the mobile platform is moved to the initial position, facilitating the execution of the next assembly task.

According to a fourth aspect, an embodiment of this disclosure provides a control method for assembling a battery, applied to the operation system according to any one of the above embodiments, where the control method includes:

determining a target auxiliary device from a plurality of auxiliary devices based an assembly instruction;

controlling the mobile platform and the assembly platform to move to a position corresponding to the target auxiliary device; and based on a position signal and an assembly recipe signal obtained by the inspection apparatus, controlling a target end effector on the robotic hand to obtain a corresponding material from the target auxiliary device to assemble a battery on the assembly platform; where the target end effector is determined from the plurality of end effectors based on the assembly instruction.

Thus, on the one hand, the mobile robot can select different end effectors based on the position signal and the assembly recipe signal to implement different assembly tasks, thereby being applicable to assembly actions for different procedures and different products, thus improving the versatility and adaptability of the mobile robot, and reducing production costs while improving production efficiency and quality, which can meet the requirements of high precision, high flexibility, and high efficiency in assembly; on the other hand, the mobile robot, the assembly platform, and the plurality of auxiliary devices cooperate with each other, improving assembly efficiency and broadening the application scenarios of the operation system.

According to a fifth aspect, an embodiment of this disclosure provides a control system for assembling a battery, applied to the mobile robot according to any one of the above embodiments, where the control system includes an upper-level computer and a plurality of controllers in communication connection with the upper-level computer, where the upper-level computer is configured to receive an assembly instruction; based on the assembly instruction, determine a target controller from the plurality of controllers; and send the assembly instruction to the target controller; and the target controller is configured to receive the assembly instruction; and based on a position signal and an assembly recipe signal obtained by the inspection apparatus, control a target end effector on the robotic hand to assemble the battery; where the target end effector is determined from the plurality of end effectors based on the assembly instruction.

Thus, on the one hand, the mobile robot is controlled to select different end effectors to implement different assembly tasks, thereby being applicable to assembly actions for different procedures and different products, thus improving the versatility and adaptability of the mobile robot, and reducing production costs while improving production efficiency and quality, which can meet the requirements of high precision, high flexibility, and high efficiency in assembly; on the other hand, different controllers are configured to respectively control the mobile robot to perform different assembly tasks, achieving integrated control of assembly tasks such as plugging, screw-locking, foam pasting, and label pasting. Additionally, with the original communication between multiple devices changed to internal system communication, communication delay is reduced, thereby reducing system operating costs while improving assembly efficiency and system stability.

In some embodiments, the target controller includes at least one of the following: a motion control module, a positioning control module, and an anomaly detection module; and the inspection apparatus includes a camera and a rangefinder, where: the motion control module is configured to control movement of the mobile platform and/or the robotic hand based on a first position signal obtained by the rangefinder and/or a first image signal obtained by the camera; the positioning control module is configured to determine position information of a target object based on a second image signal obtained by the camera; where the target object includes at least one of the following: a plug, a socket, a bolt tray, a bolt hole, foam, a label, and a pasting region; and the anomaly detection module is configured to inspect a target action performed by the target end effector to obtain a detection result; where the target action includes at least one of the following: grasping a plug, inserting a plug into a socket, pulling out a plug, screw-locking assembly, peeling foam, and peeling a label.

Thus, different modules respectively process different assembly actions of the mobile robot to ensure the orderly and correct execution of each assembly action, thereby achieving assembly of complex procedures while improving assembly efficiency and safety.

In some embodiments, in a case that the target controller includes a plugging controller, the target controller further includes a compliance control module, where the compliance control module is configured to control compliance of the target end effector on the robotic hand; in a case that the target controller includes a screw-locking controller or a foam pasting controller, the target controller further includes a range detection module, where the range detection module is configured to determine relative position information between the mobile robot and a target auxiliary device based on a second position signal obtained by the rangefinder; where the target auxiliary device is determined from a plurality of auxiliary devices based on the assembly instruction, the plurality of auxiliary devices include a bolt feeder, a foam peeler, and a label peeler; and in a case that the target controller includes a label pasting controller, the target controller further includes a counting control module, where the counting control module is configured to count the number of times of label usage.

Thus, different modules are configured for corresponding assembly procedures to execute corresponding assembly actions, ensuring the orderly and correct execution of assembly tasks, achieving a multi-module centralized control method, thereby achieving assembly of complex procedures while improving assembly efficiency and safety.

According to a fifth aspect, an embodiment of this disclosure provides a control system for assembling a battery, applied to the operation system according to any one of the above embodiments, where the control system includes a control subsystem, an assembly platform management system in communication connection with the control subsystem, and an auxiliary device management system in communication connection with the control subsystem, where the assembly platform management system is configured to manage the assembly platform based on a first control instruction sent by the control subsystem;

the auxiliary device management system is configured to manage the plurality of auxiliary devices based on a second control instruction sent by the control subsystem; and the control subsystem is configured to control the mobile platform to move to a position corresponding to a target auxiliary device; and based on a position signal and an assembly recipe signal obtained by the inspection apparatus, control a target end effector on the robotic hand to obtain a corresponding material from the target auxiliary device to assemble a battery on the assembly platform; where the target end effector is determined from the plurality of end effectors based on an assembly instruction.

Thus, on the one hand, the mobile robot is controlled to select different end effectors to implement different assembly tasks, thereby being applicable to assembly actions for different procedures and different products, thus improving the versatility and adaptability of the mobile robot, and reducing production costs while improving production efficiency and quality, which can meet the requirements of high precision, high flexibility, and high efficiency in assembly; on the other hand, adopting a multi-system centralized control method improves resource utilization while meeting the requirements of different assembly scenarios.

In some embodiments, the control system further includes a testing system; where the testing system is configured to test a battery on the assembly platform based on a testing instruction sent by the control subsystem.

Thus, integrating the testing system into the control system facilitates battery testing, and improving assembly efficiency and flexibility while broadening the application scenarios of the control system.

It should be understood that the foregoing general description and the following detailed description are merely exemplary and explanatory and are not intended to limit this disclosure.

BRIEF DESCRIPTION OF DRAWINGS

The accompanying drawings herein are incorporated into this specification and form a part of this specification. These accompanying drawings illustrate embodiments conforming to this disclosure and are intended to explain the technical solutions of this disclosure together with this specification.

Figure 1:
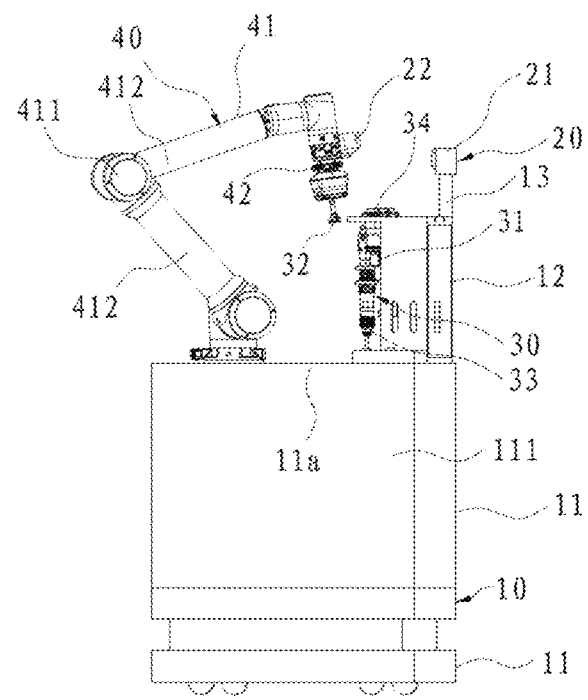
FIG. 1 is a schematic structural diagram of a mobile robot according to one or more embodiments.

DESCRIPTION OF REFERENCE SIGNS mobile platform 10; mobile chassis 11; cabinet 111; work platform 11a; tool rack 12; upright post 13;
inspection apparatus 20; global camera 21; end camera 22;
end effector 30; gripper mechanism 31; suction cup mechanism 32; screw-locking mechanism 33; quick-change plate 34;
robotic hand 40; multi-joint arm 41; arm 412; connecting joint 411; quick-change mechanism 42;
upper-level computer 61; controller 62a; plugging controller 62; first motion control module 621; compliance control module 622; first anomaly detection module 623; first positioning control module 624; screw-locking controller 63; second motion control module 631; first range detection module 632; second anomaly detection module 633; second positioning control module 634; foam pasting controller 64; third motion control module 641; second range detection module 642; third anomaly detection module 643; third positioning control module 644; label pasting controller 65; fourth motion control module 651; third range detection module 652; counting module 653; fourth anomaly detection module 654; fourth positioning control module 655; cloud 66;
control subsystem 71; assembly platform management system 72; auxiliary device management system 73;
mobile robot 100;
assembly platform 200; reflective panel 210;
auxiliary device 300; bolt feeder 310; foam peeler 320; label peeler 330;
and material tray 400.

DESCRIPTION OF EMBODIMENTS

To make the objectives, technical solutions, and advantages of this disclosure clearer, the following describes the embodiments of the technical solutions of this disclosure in detail with reference to the accompanying drawings. The following embodiments are merely used to describe technical solutions of this disclosure more explicitly, and therefore they are merely used as examples and do not constitute any limitations on the protection scope of this disclosure.

Unless otherwise defined, all technical and scientific terms used herein shall have the same meanings as commonly understood by those skilled in the art to which this disclosure pertains. The terms used in this specification are merely intended to describe specific embodiments but not intended to constitute any limitation on the embodiments of this disclosure. The terms "comprise", "include", and any variants thereof in this disclosure are intended to cover a non-exclusive inclusion.

In the description of the embodiments of this disclosure, the technical terms "first", "second", "third" and the like are merely intended to distinguish between different objects, and shall not be understood as any indication or implication of relative importance or any implicit indication of the number, sequence or primary-secondary relationship of the technical features indicated. In the description of the embodiments of this disclosure, "a plurality of" means two or more unless otherwise specifically stated.

In this specification, reference to "embodiment" means that specific features, structures or characteristics described with reference to the embodiment may be incorporated in at least one embodiment of this disclosure. The word "embodiment" appearing in various positions in the specification does not necessarily refer to the same embodiment or an independent or alternative embodiment that is exclusive of other embodiments. Persons skilled in the art explicitly and implicitly understand that the embodiments described herein may combine with another embodiment.

In the description of the embodiments of this disclosure, the term "and/or" is only an associative relationship for describing associated objects, indicating that three relationships may be present. For example, A and/or B may indicate the following three cases: presence of only A, presence of both A and B, and presence of only B. In addition, the character "/" in this specification generally indicates an "or" relationship between contextually associated objects.

In the description of the embodiments of this disclosure, unless otherwise specified and defined explicitly, the technical terms "mount", "connect", "join", and "fasten" should be understood in their general senses. For example, they may refer to a fixed connection, a detachable connection, or an integral connection, may refer to a mechanical connection or an electrical connection, and may refer to a direct connection, an indirect connection via an intermediate medium, an internal communication between two elements, or an interaction between two elements. Persons of ordinary skill in the art can understand specific meanings of these terms in the embodiments of this disclosure as appropriate to specific situations.

In the description of the embodiments of this disclosure, unless otherwise explicitly specified and defined, the technical term "contact" should be understood in its general sense. It may refer to direct contact, or contact through an intermediate medium layer. It may be contact between two elements with essentially no interaction force, or contact between two elements with interaction force.

At present, new energy batteries are increasingly applied in life and industry. New energy batteries have been not only used in energy storage power supply systems such as hydroelectric power plants, thermal power plants, wind power plants, and solar power plants, but also widely used in many other fields including electric transportation tools such as electric bicycles, electric motorcycles, and electric vehicles, and aerospace. With continuous expansion of application fields of traction batteries, market demands for the traction batteries are also expanding.

In the embodiments of this disclosure, a battery may be a battery cell. A battery cell refers to a basic unit capable of converting chemical energy into electrical energy and vice versa. It can be used to prepare battery modules or battery packs, so as to supply power to electrical apparatuses. The battery cell may be a secondary battery, where the secondary battery refers to a battery cell that can continue to be used by activating the active material through charging after the batteries are discharged. The battery cell may include a lithium-ion battery, a sodium-ion battery, a sodium-lithium-ion battery, a lithium metal battery, a sodium metal battery, a lithium-sulfur battery, a magnesium-ion battery, a nickel-metal hydride battery, a nickel-cadmium battery, a lead-acid battery, and the like. This is not limited in this embodiment of this application.

In related technologies, traction batteries are widely used in multiple fields such as energy storage power systems, electric transportation tools, military equipment, aerospace, and the like. A traction battery may be a battery cell, a battery module, or a battery. Most traction batteries are customized products, with significant differences in size, assembly sequence, and the number of battery cells required among different traction batteries. If batteries are assembled manually, issues such as low efficiency, high cost, and poor flexibility will arise. If batteries are assembled with the assistance of a robotic hand, since different procedures use different robotic hands for assembly, and the products or assembly actions corresponding to various procedures are different, a single robotic hand cannot complete the assembly actions for multiple assembly procedures. This not only results in high costs but also fails to meet the requirements of high precision, high flexibility, and high efficiency in assembly.

Embodiments of this disclosure provide a mobile robot, an operation system, a control method, and a control system for assembling a battery. The mobile robot can select different end effectors to implement different assembly tasks, thereby being applicable to assembly actions for different procedures and different products, thus improving the versatility and adaptability of the mobile robot, and reducing production costs while improving production efficiency and quality, which can meet the requirements of high precision, high flexibility, and high efficiency in assembly. The method provided in the embodiments of this disclosure may be executed by any suitable computer device, and during the implementation of the method, the computer device has a programmable logic controller (Programmable Logic Controller, PLC).

Figure 2:
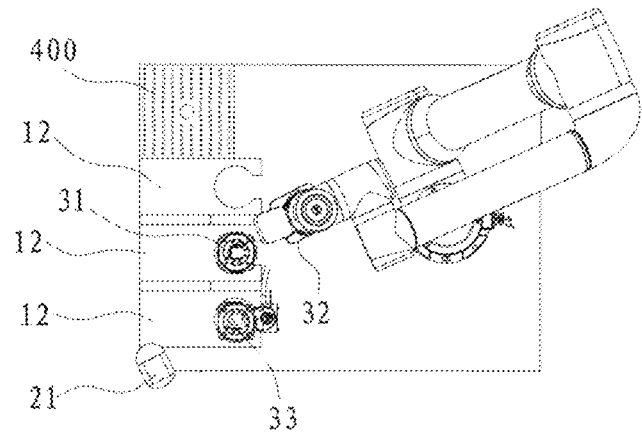
FIG. 2 is a top view of the mobile robot in FIG. 1.

Referring to FIGS. 1 and 2, an embodiment of this disclosure provides a mobile robot for assembling a battery, including a mobile platform 10, an inspection apparatus 20, a plurality of end effectors 30, and a robotic hand 40.

The mobile platform 10 is capable of receiving an assembly instruction to implement movement between different positions. The inspection apparatus 20 is disposed on the mobile platform 10, configured to obtain a position signal and an assembly recipe signal. The plurality of end effectors 30 are placed on the mobile platform 10. The robotic hand 40 is disposed on the mobile platform 10, capable of connecting to a target end effector 30 to perform a corresponding assembly action on the battery. The target end effector is determined from the plurality of end effectors based on the assembly instruction, and the assembly action is determined based on the position signal and the assembly recipe signal.

The mobile platform 10 is capable of receiving an assembly instruction to implement movement between different positions. The inspection apparatus 20, the plurality of end effectors 30, and the robotic hand 40 are disposed on the mobile platform 10 and move with the mobile platform 10.

The inspection apparatus 20 is configured to obtain a position signal and an assembly recipe signal. The position signal includes location information of the mobile platform. The assembly recipe signal includes product information and assembly recipe information corresponding to the product, such as an assembly procedure, an assembly workpiece required for the assembly procedure, location information of the assembly workpiece, and the like.

The plurality of end effectors 30 are configured to match different assembly actions.

The robotic hand 40 is capable of connecting to a target end effector 30 to perform a corresponding assembly action. That is to say, the robotic hand 40 can select and connect to a target end effector 30 according to an assembly instruction, and then, based on the position signal and the assembly recipe signal, perform the corresponding assembly action together with the target end effector 30.

In the above embodiment, the inspection apparatus 20 obtains the position signal and the assembly recipe signal. The mobile platform 10, according to the assembly instruction, drives the robotic hand 40 and the plurality of end effectors 30 to move between different positions. The robotic hand 40 can select and connect to the corresponding target end effector 30 based on the assembly instruction, and then perform the corresponding assembly action. The mobile robot for assembling a battery can select different end effectors 30 to implement multiple different assembly actions, thereby being applicable to assembly actions for multiple procedures.

For example, referring to FIG. 1, the mobile platform 10 includes a mobile chassis 11 and a tool rack 12. The mobile chassis 11 has a work platform 11a. The tool rack 12 is disposed on the work platform 11a, where the end effector 30 is placed on the tool rack 12.

The mobile chassis 11 has a mobility function, for example, it is an automated guided vehicle (Automated Guided Vehicle, AGV), capable of moving the tool rack 12 and the end effector 30 placed on the tool rack 12. In some embodiments, the mobile chassis 11 includes a cabinet 111, and the work platform 11a is located on the cabinet 111. The cabinet 111 has storage space.

The tool rack 12 is disposed on the work platform 11a and the tool rack 12 is supported by the work platform 11a.

The plurality of end effectors 30 are placed on the tool rack 12, thereby limiting the end effectors 30, facilitating the connection between the robotic hand 40 and the end effectors 30.

For example, referring to FIG. 2, the work platform 11a is provided with a positioning member and configured for placing a material tray 400, so that the end effectors 30 on the robotic hand 40 can obtain materials from the material tray 400 for assembly.

It can be understood that the positioning member is configured to position the material tray 400 on the work platform 11a and limit the displacement of the material tray 400 within the plane of the work platform 11a, thereby facilitating the end effectors 30 on the robotic hand 40 to obtain materials from the material tray 400.

For example, referring to FIG. 1, the robotic hand 40 includes a multi-joint arm 41 and a quick-change mechanism 42. The multi-joint arm 41 is disposed on the mobile platform 10 to implement assembly actions in multiple directions. The quick-change mechanism 42 is connected to an end of the multi-joint arm 41, configured for quick-change connection with different end effectors 30.

Referring to FIG. 1, the multi-joint arm 41 has multiple connecting joints 411. Each connecting joint 411 connects two arms 412, allowing the connected two arms 412 to adjust the degrees of freedom in multiple directions. Thus, the multi-joint arm 41 can implement assembly actions in multiple directions.

The quick-change mechanism 42 is connected to an end of the multi-joint arm 41. Thus, the quick-change mechanism 42 can move together with the end of the multi-joint arm 41, move to the position of an end effector 30 and connect with the end effector 30, and then move together with the end effector 30 to complete the assembly action.

The quick-change mechanism 42 has a quick-change function, that is, it can quickly connect or quickly separate the robotic hand 40 and the end effector 30. This facilitates the replacement of the end effector 30.

Referring to FIG. 1, in some embodiments, the end effector 30 is provided with a quick-change plate 34, where the quick-change plate 34 is configured to cooperate with the quick-change mechanism 42 to achieve a quick-change action.

For example, referring to FIG. 1, the inspection apparatus 20 includes a global camera 21, an end camera 22, and a light source.

The global camera 21 is disposed on the mobile platform 10 and is configured to obtain assembly environment information. The end camera 22 is disposed at an end of the robotic hand 40 to obtain a preliminary position signal of the mobile platform 10 and the assembly recipe signal. The light source is disposed adjacent to the end camera 22 to provide lighting for image capturing by the end camera 22.

The global camera 21 is configured to obtain image information by capturing, that is, assembly environment information. The assembly environment information is analyzed and processed to provide data support for control instructions. The assembly environment information can be used to obtain a position of the mobile platform 10.

In some embodiments, the mobile platform 10 is erected with an upright post 13, and the global camera 21 is disposed at the top of the upright post 13 to increase the capturing range of the global camera 21. The upright post may be disposed at a corner position of the mobile platform 10 to further reduce the obstruction of the capturing field of view of the global camera 21 by the mobile platform 10.

The end camera 22 is disposed at an end of the robotic hand 40 to obtain the assembly recipe signal. For example, a battery has a corresponding barcode, where the barcode may be a quick response code. The end camera 22 captures an image of the barcode to obtain the assembly recipe signal corresponding to the battery.

The light source is disposed adjacent to the end camera 22 to provide lighting for image capturing by the end camera 22. The light source provides lighting for image capturing by the end camera 22 to improve the clarity of the captured image. The light source may be an annular light emitter to reduce shadows and further improve the clarity of the captured image.

For example, the inspection apparatus 20 further includes a rangefinder, disposed on the mobile platform 10 to obtain a precise position signal of the mobile platform 10.

The rangefinder precisely positions the mobile platform 10, improving the accuracy of the position signal of the mobile platform 10.

The rangefinder may be a laser rangefinder. Through the provision of multiple reflective panels, cooperated with the laser rangefinder, the precise position signal of the mobile platform 10 can be obtained.

The number of rangefinders may be one or multiple. In some embodiments, the rangefinder is disposed on a rotating member, and through the rotation of the rotating member, the rangefinder can obtain the precise positions of the mobile platform 10 in multiple directions.

For example, the number of rangefinders is multiple, and they are respectively disposed in different orientations on the mobile platform 10. Thus, each rangefinder can obtain position information in the corresponding orientation, thereby the precise positions of the mobile platform 10 in multiple directions can be obtained by combining the position information of the rangefinders.

In some embodiments, two rangefinders are disposed on each of the three sides of the mobile platform 10. The mobile platform 10 is a cuboid structure with four sides. With two rangefinders disposed on each of the three sides, the positioning accuracy in the orientations that the three sides are facing can be improved.

It can be understood that the structure and number of the end effectors 30 can be adjusted according to assembly requirements.

For example, referring to FIGS. 1 and 2, the plurality of end effectors 30 include a gripper mechanism 31, a suction cup mechanism 32, and a screw-locking mechanism 33. The gripper mechanism 31 is configured to grasp a plug to test the battery. The suction cup mechanism 32 is configured to suction a material tray 400 for material loading, or suction foam, or suction a label. The screw-locking mechanism 33 is configured to suction a bolt from the material tray 400 located on the mobile platform 10 for assembly.

The gripper mechanism 31 has a function of grasping a plug for testing. The suction cup mechanism 32 has a suction function and can suction a material tray 400, suction foam, or suction a label. The material tray 400 is configured to buffer materials to be assembled, such as bolts. The foam is configured to be placed between adjacent battery cells or adjacent battery modules, with advantages such as being easily compressed, lightweight, and high-temperature resistant. The label is configured to number the battery cells or battery modules. The screw-locking mechanism 33 has the function of suctioning bolts and assembling bolts, capable of suctioning bolts from the material tray 400 and tightening the bolts on the battery to achieve screw-locking assembly.

Figure 3:
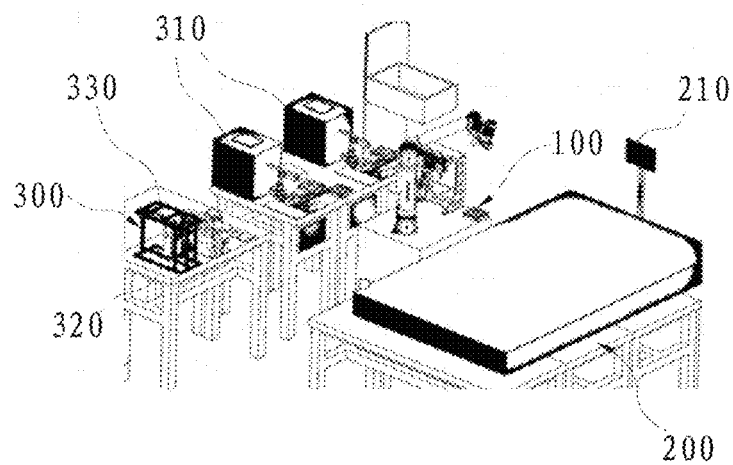
FIG. 3 is a schematic structural diagram of an operation system according to one or more embodiments.

Referring to FIG. 3, an embodiment of this disclosure provides an operation system for assembling a battery, including an assembly platform 200, a plurality of auxiliary devices 300, and a mobile robot 100.

The assembly platform 200 is configured to assemble the battery. The plurality of auxiliary devices 300 are configured to provide different materials for assembling the battery. The mobile robot 100 is capable of acquiring position information relative to the auxiliary devices 300, and obtaining materials from the plurality of auxiliary devices 300 to assemble the battery on the assembly platform 200.

The operation system for assembling a battery has an assembly station, and the assembly platform 200, the plurality of auxiliary devices 300, and the mobile robot 100 are all disposed at the assembly station, and the mobile robot 100 moves within the assembly station.

The assembly platform 200 is configured to assemble the battery. In some embodiments, the battery is disposed on the assembly platform 200 and is supported by the assembly platform 200. The assembly platform 200 may also be disposed on an automated guided vehicle (Automated Guided Vehicle, AGV) to facilitate movement between different positions.

The plurality of auxiliary devices 300 are configured to provide different materials for assembling the battery. It can be understood that the number and structure of the auxiliary devices 300 may be adjusted according to assembly requirements.

The way the mobile robot 100 obtains position information relative to the auxiliary device 300 is not limited. It can be obtained through the global camera 21, or through the rangefinder, or through both the global camera 21 and the rangefinder. In some embodiments, the auxiliary device 300 and the assembly platform 200 are provided with reflective panels 210, and the rangefinder cooperates with the reflective panels 210 to obtain the relative position information between the auxiliary device 300 and the mobile platform 10.

The mobile robot 100 is capable of obtaining materials from the plurality of auxiliary devices 300 to assemble the battery on the assembly platform 200. It can be understood that the mobile robot 100 connects the corresponding end effector 30 through material selection, thereby obtaining the material to perform assembly actions on the battery, and can replace the end effector 30 to adapt to different materials, thus having stronger adaptability, greatly alleviating the problem that the robotic hand 40 cannot be suitable for the assembly of a new model battery when the material and the assembly action change due to change in battery model.

In some embodiments, there is a passage for the mobile robot 100 to move between the assembly platform 200 and each auxiliary device, thereby reducing the movement time of the mobile robot 100 during the assembly process.

For example, the plurality of auxiliary devices 300 include a bolt feeder 310, a foam peeler 320, and a label peeler 330. The bolt feeder 310 is configured to provide a bolt. The foam peeler 320 is configured to provide foam. The label peeler 330 is configured to provide a label. In some embodiments, the auxiliary device 300 may further include a plug feeder, where the plug feeder is configured to provide a plug.

In the assembly of a battery, multiple procedures involve tightening operations, which usually require fastening bolts at preset positions. The bolt feeder 310 provides the bolts required for the assembly. In some embodiments, the bolt feeder 310 is configured to provide a material tray containing multiple bolts. In implementation, if a material tray on the work platform is an empty material tray, the empty material tray is suctioned by the end effector 30 and moved to the recovery position, and then the end effector 30 suctions a material tray filled with bolts from the bolt feeder 310 and moves the material tray filled with bolts to the work platform to complete the replacement of the material tray.

The foam peeler 320 provides foam to be placed between adjacent battery cells or adjacent battery modules.

The label peeler 330 is configured to provide labels to mark battery cells or battery modules with labels.

It can be understood that the numbers of bolt feeders 310, foam peelers 320, and label peelers 330 are not limited and can be set as one or more as needed.

In the embodiments of this disclosure, the mobile robot connects with the corresponding end effectors to obtain materials from different auxiliary devices to perform assembly actions on the battery, capable of adapting to various procedures and assembly actions of various products, improving the range of adaptation and versatility, and reducing production costs while improving production efficiency and quality, which can meet the requirements of high precision, high flexibility, and high efficiency in assembly.

Figure 4:
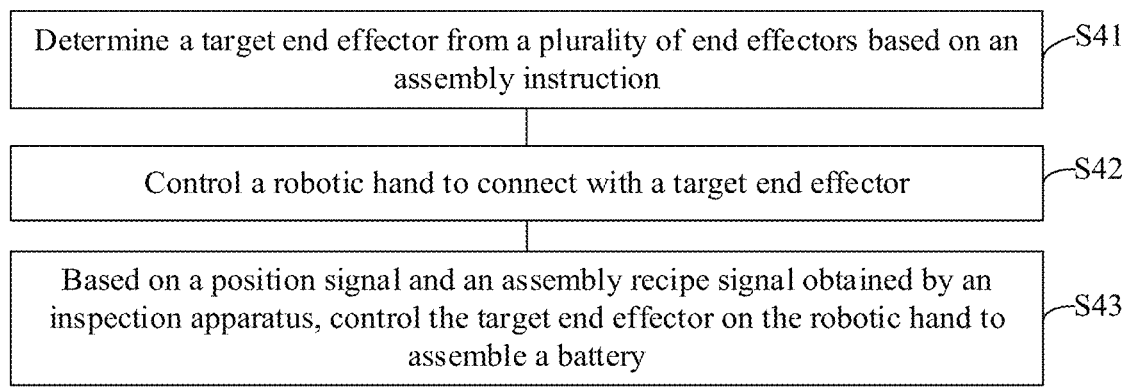
FIG. 4 is a first schematic flowchart for implementing a control method for assembling a battery according to an embodiment of this disclosure.

FIG. 4 is a first schematic flowchart for implementing a control method for assembling a battery according to an embodiment of this disclosure, applied to any of the above mobile robots. As shown in FIG. 4, the control method includes steps S41 to S43:

Step S41. Determine a target end effector from the plurality of end effectors based on an assembly instruction.

Here, the assembly instruction may be any suitable assembly instruction, for example, screw-locking, plugging, foam pasting, label pasting, and the like. The assembly instruction may be issued by a user through an upper-level computer, or received from another device, or automatically generated based on a previous assembly instruction. The end effector may include but is not limited to a gripper mechanism, a suction cup mechanism, a screw-locking mechanism, and the like. In implementation, the number of target end effectors corresponding to the assembly instruction may be at least one, and different assembly instructions may correspond to the same target end effector or different target end effectors. For example, in a case that the assembly instruction characterizes a plugging procedure, the target end effector may be a gripper mechanism, and the gripper mechanism is used to grasp a plug and insert it into the socket to test the battery; in a case that the assembly instruction characterizes a foam pasting procedure or a label pasting procedure, the target end effector may be a suction cup mechanism, and the suction cup mechanism is used to suction the foam or a label to paste the foam or label on the battery.

Step S42. Control the robotic hand to connect to the target end effector.

The robotic hand is connected with the target end effector to facilitate the robotic hand to implement the corresponding assembly procedure. In implementation, end effectors are placed on the tool rack, and the quick-change mechanism on the robotic hand is configured to achieve quick-change connection with different end effectors.

In some embodiments, step S42 includes steps S421 and S422:

Step S421. Determine a position of the target end effector based on a first image obtained by the inspection apparatus that contains the plurality of end effectors.

The inspection apparatus may be an end camera located at an end of the robotic hand, which obtains the first image through the end camera and identifies the first image to obtain the position of the target end effector. In implementation, any suitable neural network, model, and the like, capable of identifying the image can be used to obtain the position of the target end effector.

Step S422. Move the robotic hand to the position of the target end effector to connect the robotic hand with the target end effector.

The position of the target end effector is transmitted to the management system of the robotic hand, and the management system of the robotic hand controls the robotic hand to move to the position of the target end effector, achieving the connection between the quick-change mechanism on the robotic hand and the target end effector. In implementation, the management system of the robotic hand is used to control the movement of the robotic hand.

Thus, the position of the target end effector is located in real time by using the image obtained by the inspection apparatus, improving the accuracy of the position of the target end effector, thereby enhancing operational efficiency and safety.

Step S43: Based on a position signal and an assembly recipe signal obtained by the inspection apparatus, control the target end effector on the robotic hand to assemble the battery.

The inspection apparatus may be a global camera or a rangefinder located on the mobile platform, or an end camera on the robotic hand. In implementation, an image of an identifier on the battery is obtained through the end camera, where the identifier may be a quick response code, a barcode, and the like, and the image is identified to obtain the assembly recipe signal. The assembly recipe signal includes product information and assembly recipe information corresponding to the product, such as an assembly procedure, an assembly workpiece required for the assembly procedure, location information of the assembly workpiece, and the like. The position signal may include but is not limited to a position signal of the material, a position signal of the mobile platform, an assembly environment signal, and the like.

The assembly of the battery may include but is not limited to testing, label pasting, foam pasting, screw-locking (that is, assembling a bolt into a bolt hole), and the like.

In some embodiments, step S43 includes steps S431 and S432:

Step S431: Determine an assembly procedure based on the assembly recipe signal obtained by the inspection apparatus.

Different assembly recipe signals correspond to different assembly procedures, and in implementation, the assembly procedure can be obtained by parsing the assembly recipe signal. In some implementations, the assembly procedure may include but is not limited to the execution sequence of the assembly actions, the number of required materials, and the like.

Step S432: According to the assembly procedure and based on the position signal obtained by the inspection apparatus, control the target end effector on the robotic hand to assemble the battery.

Different assembly procedures correspond to different position signals, and in implementation, the corresponding position signal is transmitted to the management system of the robotic hand, and the management system of the robotic hand controls the robotic hand to move to implement the corresponding assembly action. For example, in the plugging procedure, the position signal may include but is not limited to the position signal of the plug and the position signal of the socket. For another example, in the screw-locking procedure, the position signal may include but is not limited to the position signal of the bolt tray on the bolt feeder and the position signal of the bolt hole.

Thus, the assembly procedure is determined in real time by using the assembly recipe signal obtained by the inspection apparatus, and manual operation of the assembly procedure is not required, which not only improves the accuracy of the assembly procedure but also reduces labor costs, thereby enhancing assembly efficiency and increasing the automation rate of the production line.

In some embodiments, in a case that the assembly procedure includes a plugging procedure, the position signal includes a position signal of a plug and a position signal of a socket, the target end effector includes a gripper mechanism, the assembly includes testing, and step S432 includes steps S4321 and S4322:

Step S4321. Based on the position signal of the plug obtained by the inspection apparatus, control the gripper mechanism on the robotic hand to grasp the plug.

The inspection apparatus may be the end camera on the robotic hand, where the end camera is used to capture an image containing the plug and identify the image to obtain the corresponding position signal of the plug. In implementation, the position signal of the plug is transmitted to the management system of the robotic hand, and the management system of the robotic hand guides the robotic hand to move to the position of the plug and grasp the plug according to the set compliance force. In some implementations, the management system of the robotic hand also needs to determine whether the robotic hand has grasped the plug and whether it has grasped it in place. If it has not grasped it or has not grasped it in place, the corresponding working parameters (for example, position, force, and the like) are adjusted so that the robotic hand can accurately grasp the plug.

Step S4322. Based on the position signal of the socket obtained by the inspection apparatus, control the gripper mechanism on the robotic hand to insert the plug into the socket to perform a test on the battery.

The inspection apparatus may be the end camera on the robotic hand, where the end camera is used to capture an image containing the socket and identify the image to obtain the corresponding position signal of the socket. In implementation, the position signal of the socket is transmitted to the management system of the robotic hand, and the management system of the robotic hand guides the robotic hand to move to the position of the socket and insert the plug into the socket. In some implementations, the management system of the robotic hand also needs to determine whether the plug has been inserted into the socket. If it has not been inserted or has been inserted incorrectly, the corresponding working parameters are adjusted so that the robotic hand can insert the plug into the socket.

In some implementations, the battery test can be triggered by a preset trigger method. For example, the end camera on the robotic hand scans the quick response code of the battery. For another example, the robotic hand presses the corresponding test button, and the like.

In some embodiments, after the battery test is completed, the control method further includes step S4323:

Step S4323. Control the gripper mechanism on the robotic hand to pull out the plug from the socket and move the plug to a set position in response to completion of the battery test.

The management system of the robotic hand, upon receiving the test completion signal, guides the robotic hand to pull out the plug from the socket and move the plug to the set position (that is, the original position) to facilitate the next test. In implementation, the management system of the robotic hand also needs to determine whether the plug has been correctly pulled out. If it has not been pulled out, the corresponding working parameters are adjusted so that the robotic hand can pull out the plug from the socket.

Thus, the plug and the socket are located in real time by using the position signals obtained by the inspection apparatus, enabling the mobile robot to accurately and timely perform the plugging procedure. Compared to manually performing the plugging procedure, this not only improves the efficiency of completing the plugging task but also reduces labor costs.

In some embodiments, in a case that the assembly procedure includes a screw-locking procedure, the position signal includes a position signal of a bolt tray on the bolt feeder and a position signal of a bolt hole, the target end effector includes a suction cup mechanism and a screw-locking mechanism, and step S432 includes steps S441 to S443:

Step S441: Based on the position signal of the bolt tray obtained by the inspection apparatus, control the suction cup mechanism on the robotic hand to replace a material tray on the mobile platform with the bolt tray.

The inspection apparatus may be the end camera on the robotic hand, where the end camera is used to capture an image containing the bolt tray and identify the image to obtain the corresponding position signal of the bolt tray. In implementation, the position signal of the bolt tray is transmitted to the management system of the robotic hand, and the management system of the robotic hand guides the robotic hand to move to the empty material tray on the work platform, suction the empty material tray, and move it to the recovery position, then guide the robotic hand to move to the bolt tray, suction the bolt tray, and move it to the material tray placement position on the work platform to achieve the replacement of the material tray.

Step S442: Replace the suction cup mechanism on the robotic hand with the screw-locking mechanism, and control the screw-locking mechanism on the robotic hand to suction a bolt from the bolt tray.

The quick-change mechanism of the robotic hand replaces the suction cup mechanism with the screw-locking mechanism. In implementation, the position signal may also include the position signal of the screw-locking mechanism and the position signal of the suction cup mechanism. In some implementations, the position signal of each end effector can be stored in a preset database, so that the position signal of each end effector can be obtained from the database, which shortens the assembly time and reduces system consumption compared to obtaining the position signal by capturing and identifying an image each time.

Step S443: Based on the position signal of the bolt hole obtained by the inspection apparatus, control the screw-locking mechanism on the robotic hand to assemble the bolt into the bolt hole.

The inspection apparatus may be the end camera on the robotic hand, where the end camera is used to capture an image containing the bolt hole and identify the image to obtain the corresponding position signal of the bolt hole. Since the positions of the bolt holes corresponding to different products may be different, visual positioning of the bolt hole may be used to improve the accuracy of assembly. In implementation, the position signal of the bolt hole is transmitted to the management system of the robotic hand, and the management system of the robotic hand guides the robotic hand to move to the bolt hole and screw the bolt into the bolt hole to complete the screw-locking action. In some implementations, the management system of the robotic hand also needs to determine whether the screw-locking is correct. In a case of incorrect screw-locking, the corresponding working parameters (for example, position, force, and the like) are adjusted so that the robotic hand can accurately perform the screw-locking. In implementation, since the number of bolt holes in the battery may be multiple, multiple screw-locking actions need to be performed.

Thus, the bolt and the bolt hole are located in real time by using the position signals obtained by the inspection apparatus, enabling the mobile robot to accurately and timely perform the screw-locking procedure. Compared to manually performing the screw-locking procedure, this not only improves the efficiency of completing the screw-locking task but also reduces labor costs.

In some embodiments, in a case that the assembly procedure includes a material pasting procedure, the position signal includes a position signal of a target material in the target auxiliary device and a position signal of a pasting region, the target end effector includes a suction cup mechanism, the assembly includes pasting; and step S432 includes steps S451 and S452:

Step S451. Based on the position signal of the target material obtained by the inspection apparatus, control the suction cup mechanism on the robotic hand to suction the target material.

The target material may include but is not limited to at least one of foam, label, and the like. The inspection apparatus may be the end camera on the robotic hand, where the end camera is used to capture an image containing the target material and identify the image to obtain the corresponding position signal of the target material. In implementation, the position signal of the target material is transmitted to the management system of the robotic hand, and the management system of the robotic hand guides the robotic hand to move to the position of the target material and suction the target material. In some implementations, the management system of the robotic hand also needs to determine whether the target material has been successfully peeled. If it has not been successfully peeled, the corresponding working parameters are adjusted so that the robotic hand can accurately peel the target material.

Step S452. Based on the position signal of the pasting region obtained by the inspection apparatus, control the suction cup mechanism on the robotic hand to paste the target material to the pasting region.

The inspection apparatus may be the end camera on the robotic hand, where the end camera is used to capture an image containing the pasting region and identify the image to obtain the corresponding position signal of the pasting region. Since the positions of the pasting regions corresponding to different products may be different, visual positioning of the pasting region may be used to improve the accuracy of assembly. In implementation, the position signal of the pasting region is transmitted to the management system of the robotic hand, and the management system of the robotic hand guides the robotic hand to move to the position of the pasting region and paste the target material to the pasting region.

Thus, the label, foam, and pasting position are located in real time by using the position signal obtained by the inspection apparatus, enabling the mobile robot to accurately and timely perform the material pasting procedure. Compared to manually performing the material pasting procedure, this not only improves the efficiency of completing the material pasting task but also reduces labor costs.

In some embodiments, after the assembly procedure is completed, the control method further includes steps S433 and S434:

Step S433. In response to completion of the assembly procedure of the battery, control the robotic hand to move to a position corresponding to the target end effector to separate the robotic hand from the target end effector.

When the assembly procedure is completed, the target end effector needs to be returned to the corresponding position. In implementation, the position signal of the target end effector is transmitted to the management system of the robotic hand, and the management system of the robotic hand guides the robotic hand to move to the position of the target end effector to detach the target end effector. Thus, the robotic hand restores the target end effector to the corresponding position, facilitating the robotic hand to perform the next assembly procedure.

Step S434. Control the mobile platform to move to the initial position.

The initial position may be any suitable position. In implementation, the initial position is used as the starting point of the mobile platform. Thus, the mobile platform is moved to the initial position to facilitate the execution of the next assembly task.

In the embodiments of this disclosure, the mobile robot can select different end effectors to implement different assembly tasks, thereby being applicable to assembly actions for different procedures and different products, thus improving the versatility and adaptability of the mobile robot, and reducing production costs while improving production efficiency and quality, which can meet the requirements of high precision, high flexibility, and high efficiency in assembly.

In some embodiments, the control method further includes steps S44 and S45:

Step S44. Determine a target auxiliary device from a plurality of auxiliary devices based on the assembly instruction.

Different assembly instructions correspond to different auxiliary devices. In implementation, the assembly instruction may be parsed to determine the target auxiliary device. For example, in a case that the assembly instruction characterizes a plugging procedure, the target auxiliary device may be a plug feeder providing a plug; and in a case where the assembly instruction characterizes a screw-locking procedure, the target auxiliary device may be a bolt feeder providing a bold.

Step S45. Based on a first position signal obtained by the inspection apparatus, control the mobile platform to move from an initial position to a position corresponding to the target auxiliary device.

The initial position may be any set position. The inspection apparatus may be a global camera on the mobile platform, a rangefinder, and the like. In implementation, the mobile platform is accurately moved to the target auxiliary device based on the first position signal determined by the visual camera and the rangefinder.

Thus, based on the assembly instruction and the first position signal, the mobile platform is controlled to accurately move to the pending-assembly station, allowing the robotic hand to accurately and timely obtain materials from the pending-assembly station to complete the battery assembly, thereby improving assembly efficiency and safety.

In some embodiments, the control method further includes step S46:

Step S46. Determine relative position information between the mobile robot and the target auxiliary device based on a second position signal obtained by the inspection apparatus, and store the relative position information into a preset database.

The inspection apparatus may be a rangefinder. In implementation, the position of the target auxiliary device (that is, the pending-assembly station) may be fixed, and the relative position information is determined through secondary positioning to facilitate the subsequent accurate acquisition of materials from the target auxiliary device. In some implementations, the relative position information may be determined through multiple rangefinders and multiple reflective panels. The multiple rangefinders may be installed in different orientations on the mobile platform, and the multiple reflective panels may be installed at the auxiliary devices, the assembly platform, and the like.

Thus, the precise position information of the mobile robot relative to the pending-assembly station is obtained through secondary positioning, improving the operational accuracy and safety of the mobile robot.

Figure 5:
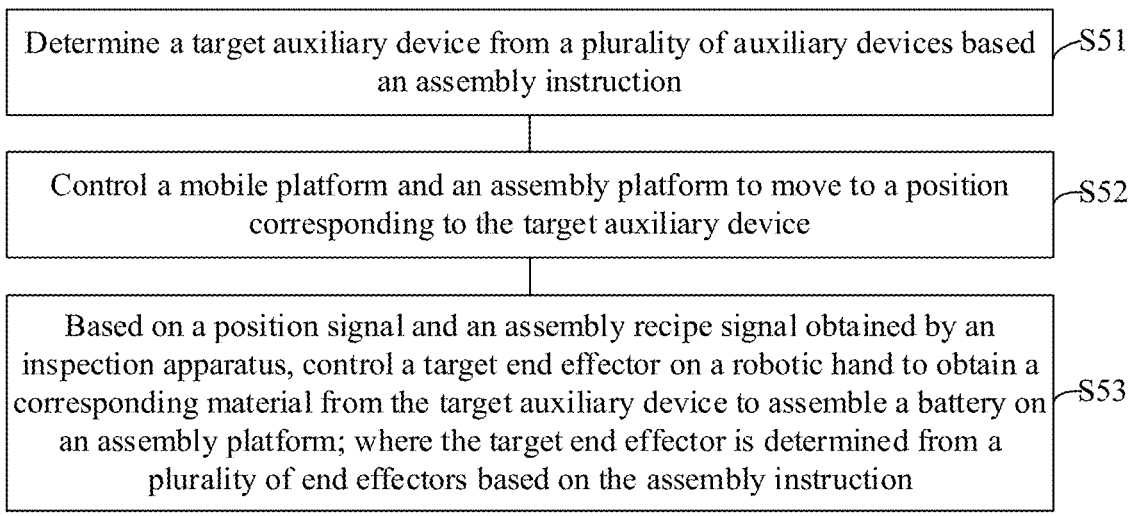
FIG. 5 is a second schematic flowchart for implementing a control method for assembling a battery according to an embodiment of this disclosure.

FIG. 5 is a second schematic flowchart for implementing a control method for assembling a battery according to an embodiment of this disclosure, applied to any of the above operation systems. As shown in FIG. 5, the control method includes steps S51 to S53:

Step S51. Determine a target auxiliary device from a plurality of auxiliary devices based an assembly instruction.

The specific implementation of the foregoing step S44 may be referred to for the above step S51.

Step S52. Control the mobile platform and the assembly platform to move to a position corresponding to the target auxiliary device.

The specific implementation of the foregoing step S45 may be referred to for the movement of the mobile platform.

The assembly platform includes the battery to be assembled. In implementation, the management system of the assembly platform, upon receiving the assembly instruction, guides the assembly platform to move to the position of the target auxiliary device. The management system of the assembly platform is used to manage the battery. In implementation, the management system of the assembly platform is in communication connection with the control system of the mobile robot for interactions about the assembly procedure.

Step S53. Based on a position signal and an assembly recipe signal obtained by the inspection apparatus, control a target end effector on the robotic hand to obtain a corresponding material from the target auxiliary device to assemble a battery on the assembly platform; where the target end effector is determined from the plurality of end effectors based on the assembly instruction.

The specific implementation of the foregoing steps S41 to S43 may be referred to for the above step S53.

In the embodiments of this disclosure, on the one hand, the mobile robot can select different end effectors based on the position signal and the assembly recipe signal to implement different assembly tasks, thereby being applicable to assembly actions for different procedures and different products, thus improving the versatility and adaptability of the mobile robot, and reducing production costs while improving production efficiency and quality, which can meet the requirements of high precision, high flexibility, and high efficiency in assembly; on the other hand, the mobile robot, the assembly platform, and the plurality of auxiliary devices cooperate with each other, improving assembly efficiency and broadening the application scenarios of the operation system.

Figure 6:
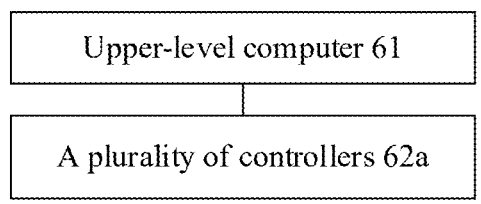
FIG. 6 is a first schematic structural diagram of composition of a control system for assembling a battery according to an embodiment of this disclosure.

FIG. 6 is a first schematic structural diagram of composition of a control system for assembling a battery according to an embodiment of this disclosure, applied to any of the above mobile robots. As shown in FIG. 6, the control system for assembling a battery includes an upper-level computer 61 and a plurality of controllers 62a in communication connection with the upper-level computer 61, where:

the upper-level computer 61 is configured to receive an assembly instruction; based on the assembly instruction, determine a target controller from the plurality of controllers; and send the assembly instruction to the target controller; and the target controller 62a is configured to receive the assembly instruction; and based on a position signal and an assembly recipe signal obtained by the inspection apparatus, control a target end effector on the robotic hand to assemble the battery; where the target end effector is determined from the plurality of end effectors based on the assembly instruction.

The upper-level computer is mainly configured to receive instructions, process the signals collected by the inspection apparatus, and the like. In some implementations, the upper-level computer may provide an operation interface to facilitate the user to issue assembly instructions. In some implementations, the upper-level computer can also communicate with the cloud, synchronize data to the cloud, or receive an assembly instruction issued by the cloud.

Different assembly procedures correspond to different controllers. In implementation, for each assembly procedure, the robotic hand is driven by the corresponding controller to execute the corresponding assembly action. The plurality of controllers may include but are not limited to a plugging controller, a screw-locking controller, a foam pasting controller, a label pasting controller, and the like. In implementation, the upper-level computer parses the assembly instruction to obtain the corresponding assembly procedure and sends the assembly instruction to the controller corresponding to the assembly procedure.

Specific implementation of the foregoing steps S41 to S43 may be referred to for the process that the target controller controls the robotic hand to assemble the battery. In some implementations, at least one control module may be integrated in the target controller. Different control modules are configured to achieve different functions.

In some embodiments, the target controller 62a includes at least one of the following: a motion control module, a positioning control module, and an anomaly detection module; and the inspection apparatus includes a camera and a rangefinder, where:

the motion control module is configured to control movement of the mobile platform and/or the robotic hand based on a first position signal obtained by the rangefinder and/or a first image signal obtained by the camera;

the positioning control module is configured to determine position information of a target object based on a second image signal obtained by the camera; where the target object includes at least one of the following: a plug, a socket, a bolt tray, a bolt hole, foam, a label, and a pasting region; and the anomaly detection module is configured to inspect a target action performed by the target end effector to obtain a detection result; where the target action includes at least one of the following: grasping a plug, inserting a plug into a socket, pulling out a plug, screw-locking assembly, peeling foam, and peeling a label.

Thus, different modules respectively process different assembly actions of the mobile robot to ensure the orderly and correct execution of each assembly action, achieving a multi-module centralized control method, thereby achieving assembly of complex procedures while improving assembly efficiency and safety.

In some embodiments, in a case that the target controller includes a plugging controller, the target controller further includes a compliance control module, where the compliance control module is configured to control compliance of the target end effector on the robotic hand.

In some embodiments, in a case that the target controller includes a screw-locking controller or a foam pasting controller, the target controller further includes a range detection module, where the range detection module is configured to determine relative position information between the mobile robot and a target auxiliary device based on a second position signal obtained by the rangefinder; where the target auxiliary device is determined from a plurality of auxiliary devices based on the assembly instruction, the plurality of auxiliary devices include a bolt feeder, a foam peeler, and a label peeler.

In some embodiments, in a case that the target controller includes a label pasting controller, the target controller further includes a counting control module, where the counting control module is configured to count the number of times of label usage.

Figure 7:
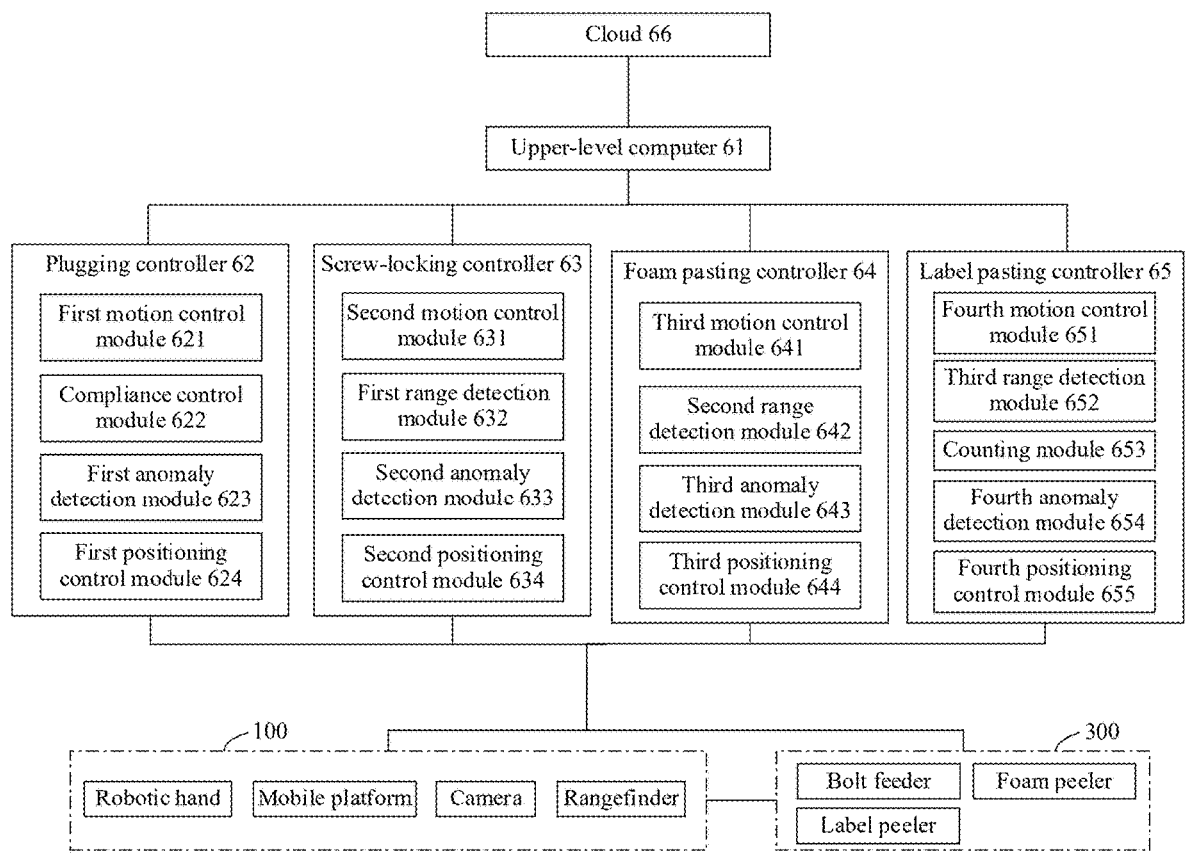
FIG. 7 is a second schematic structural diagram of composition of a control system for assembling a battery according to an embodiment of this disclosure.

FIG. 7 is a second schematic structural diagram of composition of a control system for assembling a battery according to an embodiment of this disclosure. As shown in FIG. 7, the control system for assembling a battery includes an upper-level computer 61, a plugging controller 62, a screw-locking controller 63, a foam pasting controller 64, and a label pasting controller 65, where:

the upper-level computer 61 is in communication connection with the cloud 66 through the network and establishes communication connection separately with each controller (that is, the plugging controller 62, the screw-locking controller 63, the foam pasting controller 64, and the label pasting controller 65). In implementation, the upper-level computer 61 determines at least one target controller from the plurality of controllers based on the assembly instruction and sends the assembly instruction to the corresponding target controller. Each controller communicates with the mobile robot 100 and the plurality of auxiliary devices 300 through wired or wireless means;

the plugging controller 62 includes a first motion control module 621, a compliance control module 622, a first anomaly detection module 623, and a first positioning control module 624, where the first motion control module 621 is configured to control the rotation of the robotic hand and/or the mobile platform based on the position signal obtained by the camera, rangefinder, and the like, of the mobile robot; the compliance control module 622 is configured to control the compliance of the robotic hand in grasping the plug; the first anomaly detection module 623 is configured to inspect actions such as grasping the plug, inserting the plug into the socket, and pulling out the plug, and in a case of anomaly in the action inspection results, adjust the working parameters of the robotic hand to ensure the correct execution of the action; and the first positioning control module 624 is configured to determine the position information of objects such as the plug and the socket based on the image signal obtained by the camera of the mobile robot to facilitate the robotic hand in performing the plugging assembly action;

the screw-locking controller 63 includes a second motion control module 631, a first range detection module 632, a second anomaly detection module 633, and a second positioning control module 634, where the second motion control module 631 is configured to control the rotation of the robotic hand and/or the mobile platform based on the position signal obtained by the camera, rangefinder, and the like, of the mobile robot; the first range detection module 632 is configured to determine the relative position information between the mobile robot and the bolt feeder based on the position signal obtained by the rangefinder of the mobile robot to accurately obtain the bolt tray from the bolt feeder; the second anomaly detection module 633 is configured to inspect a screw-locking action and in a case of anomaly in the screw-locking action inspection results, adjust the working parameters of the robotic hand to ensure the correct execution of the screw-locking action; and the second positioning control module 634 is configured to determine the position information of objects such as the bolt tray, bolt, and bolt hole based on the image signal obtained by the camera of the mobile robot to facilitate the robotic hand in performing the screw-locking assembly action;

the foam pasting controller 64 includes a third motion control module 641, a second range detection module 642, a third anomaly detection module 643, and a third positioning control module 644, where the third motion control module 641 is configured to control the rotation of the robotic hand and/or the mobile platform based on the position signal obtained by the camera, rangefinder, and the like, of the mobile robot; the second range detection module 642 is configured to determine the relative position information between the mobile robot and the foam peeler based on the position signal obtained by the rangefinder of the mobile robot to accurately obtain the foam from the foam peeler; the third anomaly detection module 643 is configured to inspect actions such as foam peeling and foam pasting and in a case of anomaly in the action inspection results, adjust the working parameters of the robotic hand to ensure the correct execution of the action; and the third positioning control module 644 is configured to determine the position information of objects such as the foam and pasting position based on the image signal obtained by the camera of the mobile robot to facilitate the robotic hand in performing the foam pasting assembly action; and the label pasting controller 65 includes a fourth motion control module 651, a third range detection module 652, a counting module 653, a fourth anomaly detection module 654, and a fourth positioning control module 655, where the fourth motion control module 651 is configured to control the rotation of the robotic hand and/or the mobile platform based on the position signal obtained by the camera, rangefinder, and the like, of the mobile robot; the third range detection module 652 is configured to determine the relative position information between the mobile robot and the label peeler based on the position signal obtained by the rangefinder of the mobile robot to accurately obtain the label from the label peeler; the counting module 653 is configured to count the number of times of label pasting; the fourth anomaly detection module 654 is configured to inspect actions such as label peeling and label pasting and in a case of anomaly in the action inspection results, adjust the working parameters of the robotic hand to ensure the correct execution of the action; and the fourth positioning control module 655 is configured to determine the position information of objects such as the label and pasting position based on the image signal obtained by the camera of the mobile robot to facilitate the robotic hand to perform the label pasting assembly action.

Figure 8:
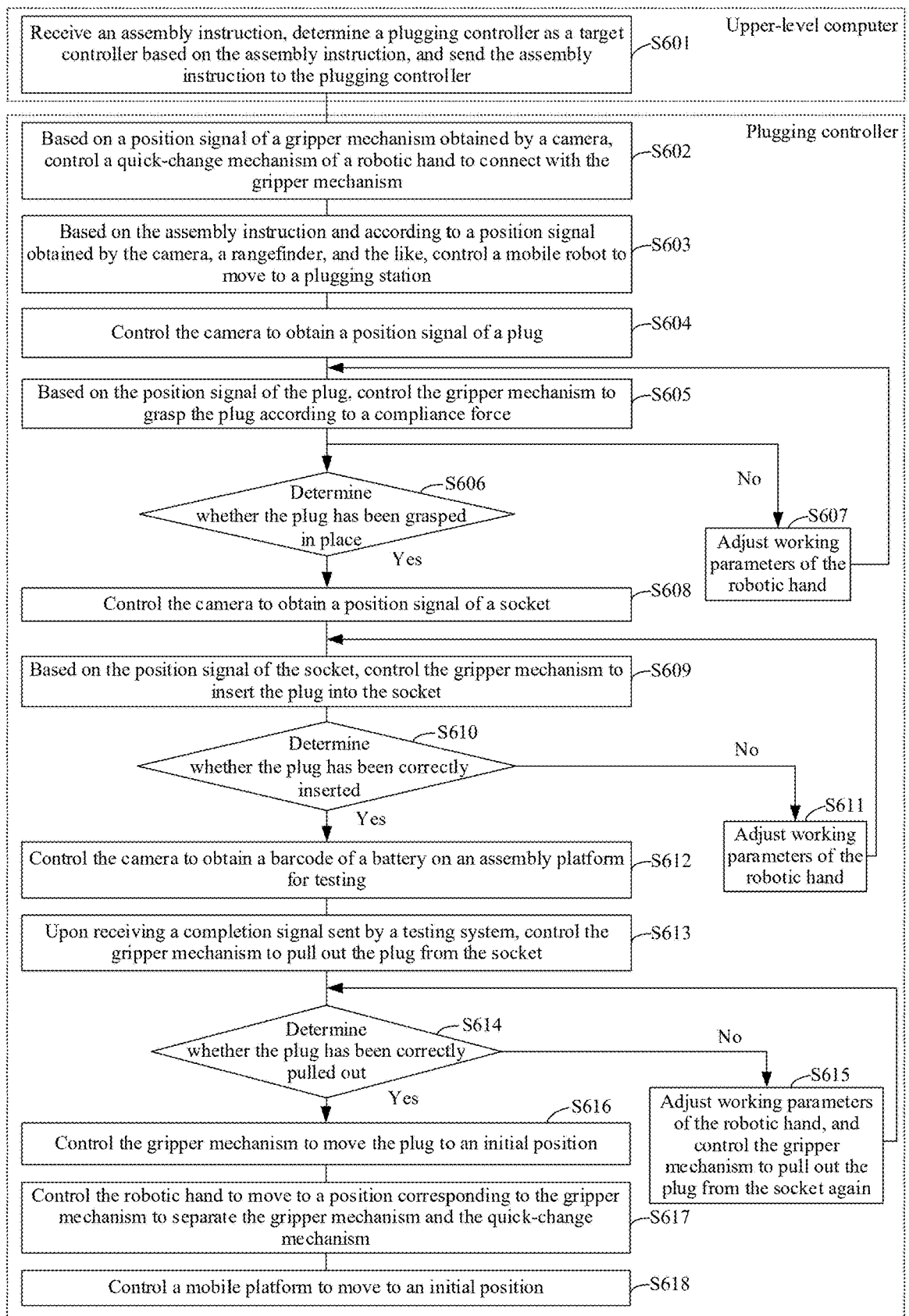
FIG. 8 is a third schematic flowchart for implementing a control method for assembling a battery according to an embodiment of this disclosure.

FIG. 8 is a third schematic flowchart for implementing a control method for assembling a battery according to an embodiment of this disclosure, applied to a mobile robot. As shown in FIG. 8, the control method includes steps S601 to S618:

Step S601. An upper-level computer receives an assembly instruction, determines a plugging controller as a target controller based on the assembly instruction, and sends the assembly instruction to the plugging controller.

Step S602. Based on a position signal of a gripper mechanism obtained by a camera, the plugging controller controls a quick-change mechanism of a robotic hand to connect to the gripper mechanism (corresponding to the foregoing target end effector).

Step S603. Based on the assembly instruction and according to a position signal obtained by the camera, a rangefinder, and the like, the plugging controller controls the mobile robot to move to a plugging station.

Here, the execution sequence of steps S602 and S603 is not limited. Step S602 may be executed first, or step S603 may be executed first, or steps S602 and S603 may be executed simultaneously.

Step S604. The plugging controller controls the camera to obtain a position signal of a plug.

Step S605. Based on the position signal of the plug, the plugging controller controls the gripper mechanism to grasp the plug according to a compliance force.

Step S606. The plugging controller determines whether the plug has been grasped in place. If yes, proceed to step S608; otherwise, proceed to step S607.

Step S607. The plugging controller adjusts working parameters of the robotic hand and proceeds to step S605.

Step S608. The plugging controller controls the camera to obtain a position signal of a socket.

Step S609. Based on the position signal of the socket, the plugging controller controls the gripper mechanism to insert the plug into the socket.

Step S610. The plugging controller determines whether the plug has been correctly inserted. If yes, proceed to step S612; otherwise, proceed to step S611.

Step S611. The plugging controller adjusts working parameters of the robotic hand and proceeds to step S609.

Step S612. The plugging controller controls the camera to obtain a barcode of a battery on an assembly platform for testing.

Step S613. The plugging controller, upon receiving a completion signal sent by a testing system, controls the gripper mechanism to pull out the plug from the socket.

Step S614. The plugging controller determines whether the plug has been correctly pulled out. If yes, proceed to step S616; otherwise, proceed to step S615.

Step S615. The plugging controller adjusts working parameters of the robotic hand, controls the gripper mechanism to pull out the plug from the socket again, and proceeds to step S614.

Step S616. The plugging controller controls the gripper mechanism to move the plug to an initial position.

Step S617. The plugging controller controls the robotic hand to move to a position corresponding to the gripper mechanism to separate the gripper mechanism and the quick-change mechanism.

Step S618. The plugging controller controls a mobile platform to move to an initial position.

Figure 9:
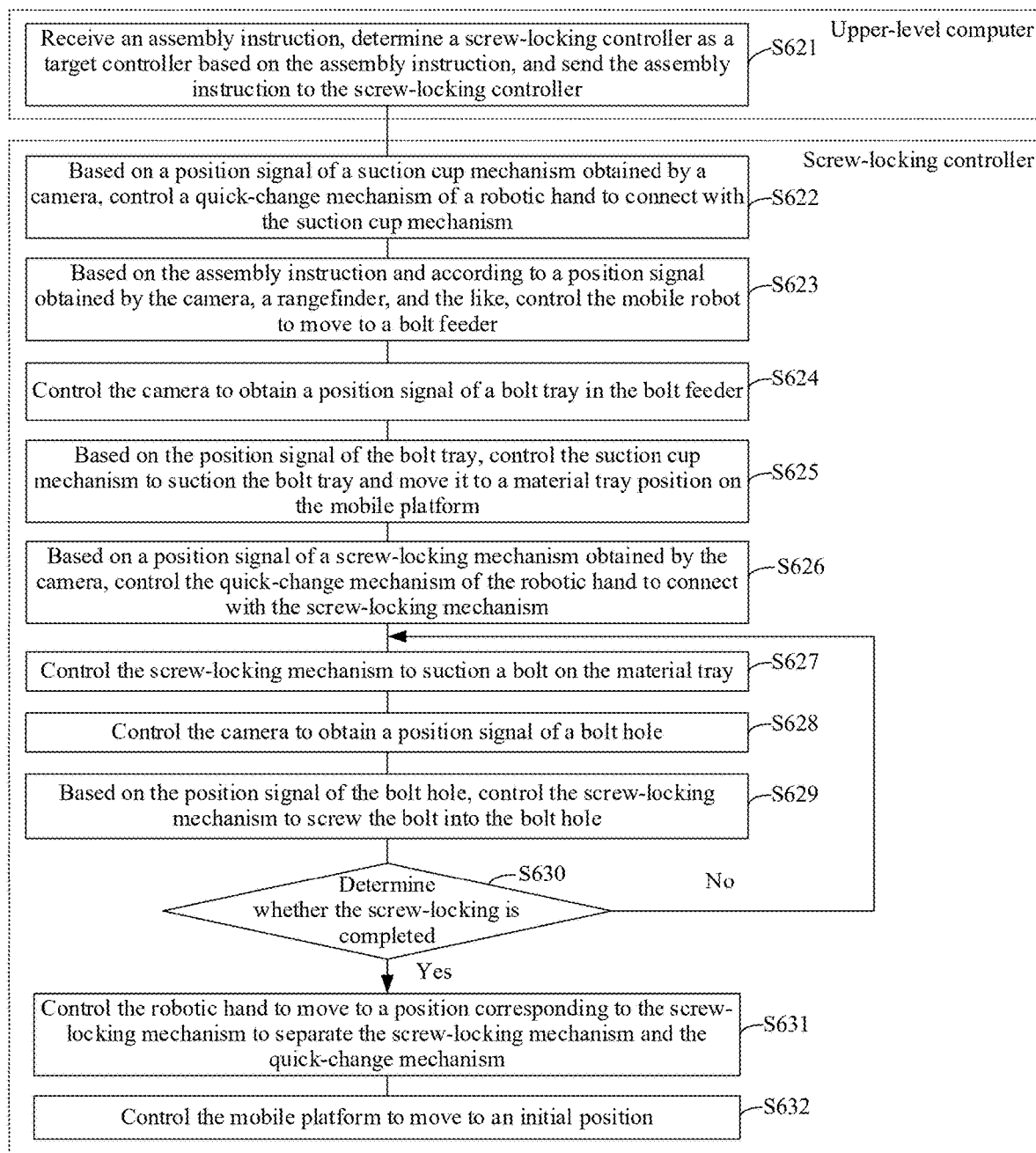
FIG. 9 is a fourth schematic flowchart for implementing a control method for assembling a battery according to an embodiment of this disclosure.

FIG. 9 is a fourth schematic flowchart for implementing a control method for assembling a battery according to an embodiment of this disclosure, applied to a mobile robot. As shown in FIG. 9, the control method includes steps S621 to S632:

Step S621. An upper-level computer receives an assembly instruction, determines a screw-locking controller as a target controller based on the assembly instruction, and sends the assembly instruction to the screw-locking controller.

Step S622. Based on a position signal of a suction cup mechanism obtained by a camera, the screw-locking controller controls a quick-change mechanism of a robotic hand to connect to the suction cup mechanism (corresponding to the foregoing target end effector).

Step S623. Based on the assembly instruction and according to a position signal obtained by the camera, a rangefinder, and the like, the screw-locking controller controls the mobile robot to move to a bolt feeder.

Here, the execution sequence of steps S622 and S623 is not limited. Step S622 may be executed first, or step S623 may be executed first, or steps S622 and S623 may be executed simultaneously.

Step S624. The screw-locking controller controls the camera to obtain a position signal of a bolt tray in the bolt feeder.

Step S625. Based on the position signal of the bolt tray, the screw-locking controller controls the suction cup mechanism to suction the bolt tray and move it to a material tray position on a mobile platform.

Here, the screw-locking controller can first control the suction cup mechanism to suction an empty material tray on the mobile platform and move it to a recovery position, and then control the suction cup mechanism to suction the bolt tray and move it to the material tray position on the mobile platform.

Step S626. Based on a position signal of a screw-locking mechanism obtained by the camera, the screw-locking controller controls the quick-change mechanism of the robotic hand to connect to the screw-locking mechanism (corresponding to the foregoing target end effector).

Here, the screw-locking controller can first move the robotic hand to a position corresponding to the suction cup mechanism to separate the quick-change mechanism of the robotic hand from the suction cup mechanism; then move the robotic hand to a position corresponding to the screw-locking mechanism to connect the quick-change mechanism with the screw-locking mechanism.

Step S627. The screw-locking controller controls the screw-locking mechanism to suction a bolt on the material tray.

Step S628. The screw-locking controller controls the camera to obtain a position signal of a bolt hole.

Step S629. Based on the position signal of the bolt hole, the screw-locking controller controls the screw-locking mechanism to screw the bolt into the bolt hole.

Step S630. The screw-locking controller determines whether the screw-locking is completed. If yes, proceed to step S631; otherwise, proceed to step S627.

Step S631. The screw-locking controller controls the robotic hand to move to a position corresponding to the screw-locking mechanism to separate the screw-locking mechanism and the quick-change mechanism.

Step S632. The screw-locking controller controls the mobile platform to move to an initial position.

Figure 10:
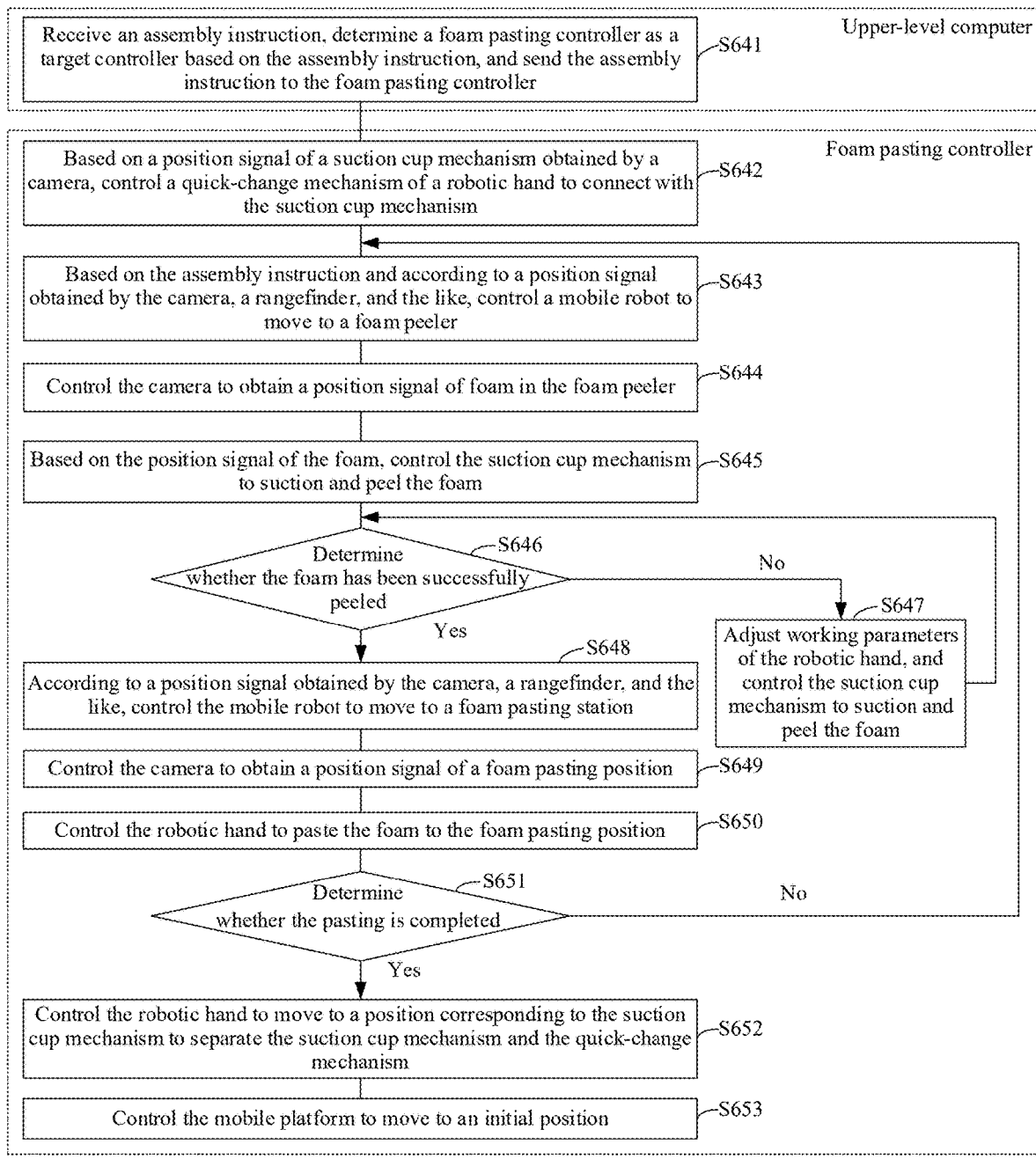
FIG. 10 is a fifth schematic flowchart for implementing a control method for assembling a battery according to an embodiment of this disclosure.

FIG. 10 is a fifth schematic flowchart for implementing a control method for assembling a battery according to an embodiment of this disclosure, applied to a mobile robot. As shown in FIG. 10, the control method includes steps S641 to S653:

Step S641. An upper-level computer receives an assembly instruction, determines a foam pasting controller as a target controller based on the assembly instruction, and sends the assembly instruction to the foam pasting controller.

Step S642. Based on a position signal of a suction cup mechanism obtained by a camera, the foam pasting controller controls a quick-change mechanism of a robotic hand to connect to the suction cup mechanism (corresponding to the foregoing target end effector).

Step S643. Based on the assembly instruction and according to a position signal obtained by the camera, a rangefinder, and the like, the foam pasting controller controls the mobile robot to move to a foam peeler.

Here, the execution sequence of steps S642 and S643 is not limited. Step S642 may be executed first, or step S643 may be executed first, or steps S642 and S643 may be executed simultaneously.

Step S644. The foam pasting controller controls the camera to obtain a position signal of foam in the foam peeler.

Step S645. Based on the position signal of the foam, the foam pasting controller controls the suction cup mechanism to suction and peel the foam.

Step S646. The foam pasting controller determines whether the foam has been successfully peeled. If yes, proceed to step S648; otherwise, proceed to step S647.

Step S647. The foam pasting controller adjusts working parameters of the robotic hand, and controls the suction cup mechanism to suction and peel the foam. Proceed to step S646.

Step S648. According to a position signal obtained by the camera, a rangefinder, and the like, the foam pasting controller controls the mobile robot to move to a foam pasting station.

Step S649. The foam pasting controller controls the camera to obtain a position signal of a foam pasting position.

Step S650. The foam pasting controller controls the robotic hand to paste the foam to the foam pasting position.

Step S651. The foam pasting controller determines whether the pasting is completed. If yes, proceed to step S652; otherwise, proceed to step S643.

Step S652. The foam pasting controller controls the robotic hand to move to a position corresponding to the suction cup mechanism to separate the suction cup mechanism and the quick-change mechanism.

Step S653. The foam pasting controller controls a mobile platform to move to an initial position.

Figure 11:
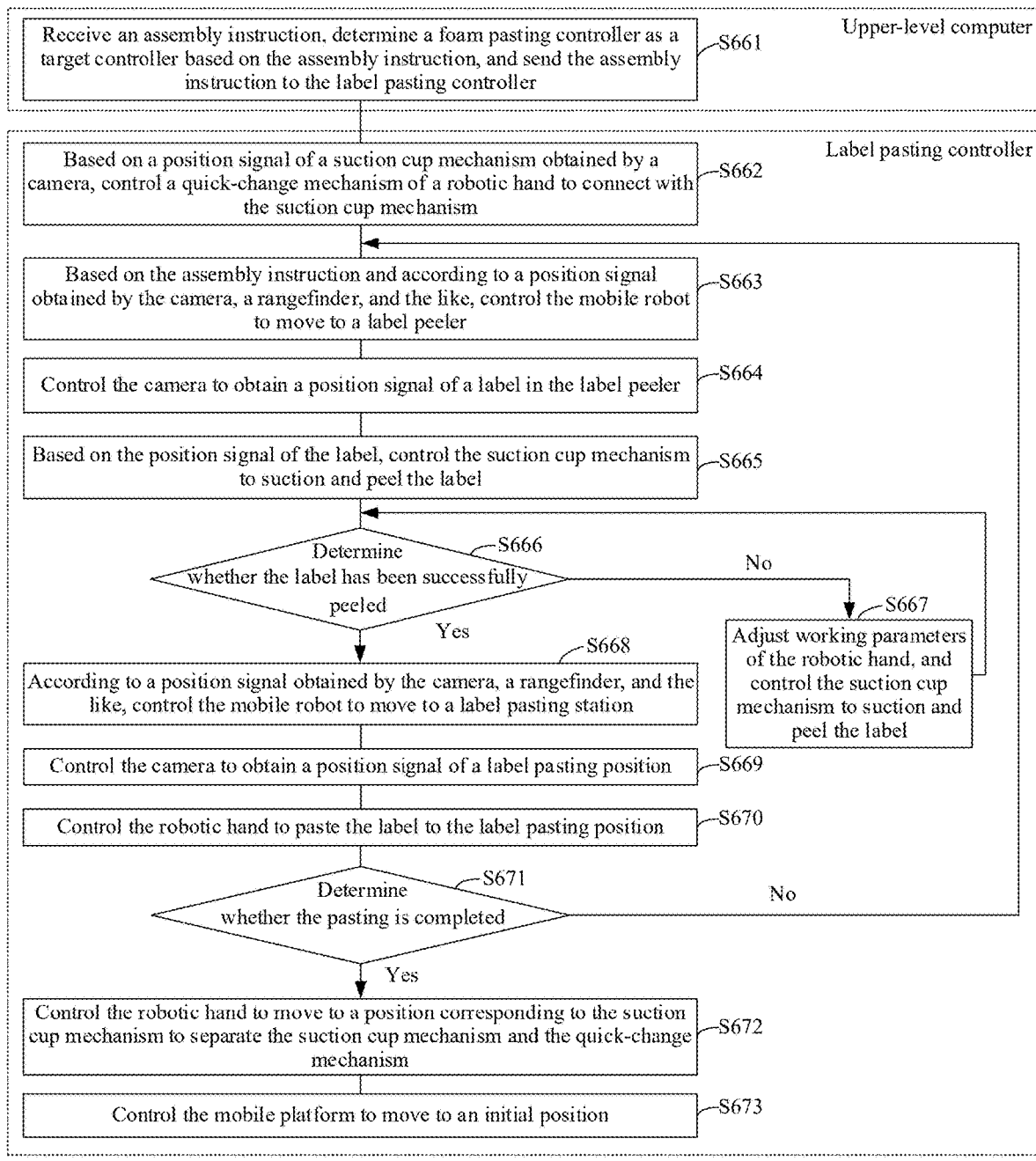
FIG. 11 is a sixth schematic flowchart for implementing a control method for assembling a battery according to an embodiment of this disclosure.

FIG. 11 is a sixth schematic flowchart for implementing a control method for assembling a battery according to an embodiment of this disclosure, applied to a mobile robot. As shown in FIG. 11, the control method includes steps S661 to S673:

Step S661. An upper-level computer receives an assembly instruction, determines a label pasting controller as a target controller based on the assembly instruction, and sends the assembly instruction to the label pasting controller.

Step S662. Based on a position signal of a suction cup mechanism obtained by a camera, the label pasting controller controls a quick-change mechanism of a robotic hand to connect to the suction cup mechanism (corresponding to the foregoing target end effector).

Step S663. Based on the assembly instruction and according to a position signal obtained by the camera, a rangefinder, and the like, the label pasting controller controls the mobile robot to move to a label peeler.

Here, the execution sequence of steps S662 and S663 is not limited. Step S662 may be executed first, or step S663 may be executed first, or steps S662 and S663 may be executed simultaneously.

Step S664. The label pasting controller controls the camera to obtain a position signal of a label in the label peeler.

Step S665. Based on the position signal of the label, the label pasting controller controls the suction cup mechanism to suction and peel the label.

Step S666. The label pasting controller determines whether the label has been successfully peeled. If yes, proceed to step S668; otherwise, proceed to step S667.

Step S667. The label pasting controller adjusts working parameters of the robotic hand, and controls the suction cup mechanism to suction and peel the label. Proceed to step S666.

Step S668. According to a position signal obtained by the camera, a rangefinder, and the like, the label pasting controller controls the mobile robot to move to a label pasting station.

Step S669. The label pasting controller controls the camera to obtain a position signal of a label pasting position.

Step S670. The label pasting controller controls the robotic hand to paste the label to the label pasting position.

Step S671. The label pasting controller determines whether the pasting is completed. If yes, proceed to step S672; otherwise, proceed to step S663.

Step S672. The label pasting controller controls the robotic hand to move to a position corresponding to the suction cup mechanism to separate the suction cup mechanism and the quick-change mechanism.

Step S673. The label pasting controller controls the mobile platform to move to an initial position.

In the embodiments of this disclosure, on the one hand, the mobile robot is controlled to select different end effectors to implement different assembly tasks, thereby being applicable to assembly actions for different procedures and different products, thus improving the versatility and adaptability of the mobile robot, and reducing production costs while improving production efficiency and quality, which can meet the requirements of high precision, high flexibility, and high efficiency in assembly; on the other hand, different controllers are configured to respectively control the mobile robot to perform different assembly tasks, achieving integrated control of assembly tasks such as plugging, screw-locking, foam pasting, and label pasting. Additionally, with the original communication between multiple devices changed to internal system communication, communication delay is reduced, thereby reducing system operating costs while improving assembly efficiency and system stability.

Figure 12:
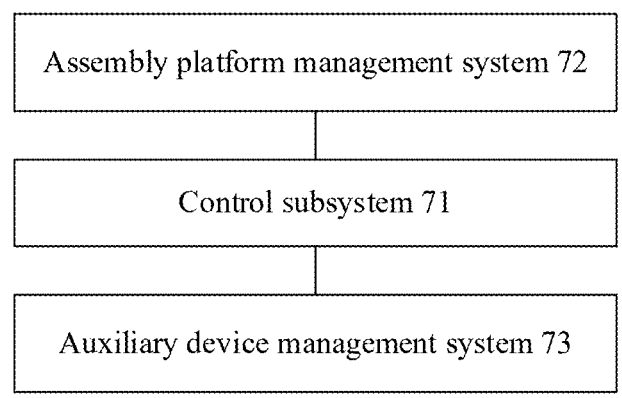
FIG. 12 is a third schematic structural diagram of composition of a control system for assembling a battery according to an embodiment of this disclosure.

FIG. 12 is a third schematic structural diagram of composition of a control system for assembling a battery according to an embodiment of this disclosure, applied to any of the above operation systems. As shown in FIG. 12, the control system for assembling a battery includes a control subsystem 71, an assembly platform management system 72 in communication connection with the control subsystem, and an auxiliary device management system 73 in communication connection with the control subsystem, where:

the assembly platform management system 71 is configured to manage the assembly platform based on a first control instruction sent by the control subsystem;

the auxiliary device management system 72 is configured to manage the plurality of auxiliary devices based on a second control instruction sent by the control subsystem;

the control subsystem 73 is configured to control the mobile platform to move to a position corresponding to a target auxiliary device; and based on a position signal and an assembly recipe signal obtained by the inspection apparatus, control a target end effector on the robotic hand to obtain a corresponding material from the target auxiliary device to assemble a battery on the assembly platform; where the target end effector is determined from the plurality of end effectors based on an assembly instruction.

Here, the assembly platform management system 71 may be any suitable system that can implement management of the assembly platform. The first control instruction is used to control the assembly platform, and in implementation, the first control instruction may be any suitable instruction, for example, an instruction for moving the assembly platform to the pending-assembly station, moving the assembly platform to the initial position, or the like.

The auxiliary device management system 72 may be any suitable system that can implement management of the auxiliary devices. In some implementations, the auxiliary device management system 72 may include but is not limited to a control cabinet, a PLC, a sensor, a microcontroller, and the like. The upper and lower levels may communicate through an industrial Ethernet protocol, a network protocol, and the like, to control the bolt feeder, foam peeler, label peeler, and other auxiliary devices to complete the corresponding actions, and/or to control the sensors to collect environmental images, position information, and the like.

The second control instruction is used to manage multiple auxiliary devices, and in implementation, the second control instruction may be any suitable instruction, with different auxiliary devices corresponding to different second control instructions. For example, for the bolt feeder, the second control instruction may be to load bolts from the storage bin to a bolt tray; for the foam peeler, the second control instruction may be to transfer foam from the foam storage bin to a material pick-up position; and for the label peeler, the second control instruction may be to print labels and move the labels with the release paper peeled off to a material pick-up position.

The specific implementation of the foregoing step S53 can be referred to for the process of the control subsystem executing the assembly actions.

In some implementations, the control subsystem includes a first subsystem that controls the mobile platform, where the first subsystem communicates with the control subsystem through any suitable communication method (for example, industrial Ethernet) to achieve actions of the mobile platform such as precise movement, in-place rotation, and the like. In some implementations, the first subsystem includes a control cabinet, a sensor, and the like, and the upper and lower levels communicate through an industrial Ethernet protocol.

In some implementations, the control subsystem includes a second subsystem that controls the robotic hand, where the second subsystem communicates with the control subsystem through any suitable communication method (for example, industrial Ethernet) to control the movement of the robotic hand, the end effector on the robotic hand to perform the corresponding assembly actions, and the like. The second subsystem includes a control cabinet, a PLC, a sensor, and the like, and the upper and lower levels communicate through an industrial Ethernet protocol.

In some embodiments, the control system further includes a testing system, where the testing system is configured to test a battery on the assembly platform based on a testing instruction sent by the control subsystem.

When the control subsystem completes the plugging procedure, it sends the testing instruction to the testing system by scanning the barcode of the battery. The testing system is configured to test and verify information such as the performance and power consumption of the battery. Thus, integrating the testing system into the control system facilitates battery testing, and improving assembly efficiency and flexibility while broadening the application scenarios of the control system.

In the embodiments of this disclosure, on the one hand, the mobile robot is controlled to select different end effectors to implement different assembly tasks, thereby being applicable to assembly actions for different procedures and different products, thus improving the versatility and adaptability of the mobile robot, and reducing production costs while improving production efficiency and quality, which can meet the requirements of high precision, high flexibility, and high efficiency in assembly; on the other hand, adopting a multi-system centralized control method improves resource utilization while meeting the requirements of different assembly scenarios.

It should be noted that the above examples are merely intended for describing the technical solutions of this disclosure but not for limiting this application. Although this disclosure is described in detail with reference to the foregoing examples, persons of ordinary skill in the art should understand that they may still make modifications to the technical solutions described in the foregoing examples or make equivalent replacements to some or all technical features thereof without departing from the scope of the technical solutions of the examples of this disclosure. They should all be covered in the scope of this disclosure. In particular, as long as there is no structural conflict, the various technical features mentioned in the embodiments can be combined in any manner. This disclosure is not limited to the specific embodiments disclosed herein.

It should be understood that "one embodiment" or "an embodiment" mentioned throughout the specification means that a particular feature, structure, or characteristic in connection with the embodiment is included in at least one embodiment of this disclosure. Therefore, "in one embodiment" or "in an embodiment" appearing throughout the specification does not necessarily refer to a same embodiment. In addition, these particular features, structures, or characteristics can be combined in any suitable manner in one or more embodiments. It should be understood that, in the various embodiments of this disclosure, sequence numbers of the foregoing processes do not mean execution sequences. The execution sequences of the processes should be determined according to functions and internal logic of the processes, and should not be construed as any limitation on the implementation processes of embodiments of this disclosure. The sequence numbers of the embodiments of this disclosure are merely for description and do not represent the merits or demerits of the embodiments. It should be noted that in this document, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

In the several embodiments provided by this disclosure, it should be understood that the disclosed devices and methods may be implemented in other manners. The described device embodiments are merely illustrative. For example, the unit division is merely logical function division and other division manners may be used in actual implementation. For example, a plurality of units or components may be combined or integrated into another system, or some features may be ignored or not be performed. In addition, the displayed or discussed mutual couplings, direct couplings, or communication connections between the various components may be indirect couplings or communication connections through some interfaces, devices or units, and may be in electrical, mechanical, or other forms.

The units described as separate parts may or may not be physically separate. Parts displayed as units may or may not be physical units, meaning they may be located in one position or distributed on a plurality of network units. Some or all of the units may be selected depending on actual requirements to achieve the objectives of the solutions in the embodiments. In addition, the function units in the embodiments of this disclosure may all be integrated into one processing unit, or each unit may be separately used as a single unit, or two or more units may be integrated into one unit. The integrated units may be implemented in a form of hardware or in a form of hardware plus software function units.

Persons of ordinary skill in the art can understand that all or part of the steps of the above method embodiments may be completed by hardware related to program instructions, where the program may be stored in a computer-readable storage medium, and when the program is executed, the steps of the above method embodiments are included. The foregoing storage medium includes any medium that can store program codes, such as a mobile storage device, a read-only memory (Read Only Memory, ROM), a magnetic disk, or an optical disk. Alternatively, when the integrated units in this disclosure are implemented in the form of a software functional module and sold or used as an independent product, the integrated module may also be stored in a computer-readable storage medium. Based on such an understanding, the essence or parts making contributions to related arts of the technical solutions of this disclosure may be embodied in a form of software product, and the computer software product is stored in a storage medium, including a plurality of instructions for enabling a computer device (which may be a personal computer, a server, a network device or the like) to execute all or part of the method in each embodiment of this disclosure. The foregoing storage medium includes any medium that can store program codes such as a mobile storage device, a ROM, a magnetic disk, or an optical disk.

The foregoing descriptions are merely implementations of this disclosure and not intended to limit the scope of protection of this disclosure. Any variations or replacements apparent to those skilled in the art within the technical scope disclosed by this disclosure shall fall within the scope of protection of this disclosure.

INDUSTRIAL APPLICABILITY

In this disclosure, integrating the testing system into the control system facilitates battery testing, improving assembly efficiency and flexibility and broadening the application scenarios of the control system.

The invention claimed is:

1. A mobile robot for assembling a battery, comprising:
 a mobile platform, capable of receiving an assembly instruction to implement movement between different positions;
 an inspection apparatus, disposed on the mobile platform and configured to obtain a position signal and an assembly recipe signal;
 a plurality of end effectors, placed on the mobile platform; and
 a robotic hand, disposed on the mobile platform and capable of connecting to a target end effector to perform a corresponding assembly action on the battery; wherein the target end effector is determined from the plurality of end effectors based on the assembly instruction, and the assembly action is determined based on the position signal and the assembly recipe signal.

2. The mobile robot according to claim 1, wherein the mobile platform comprises:
 a mobile chassis, having a work platform; and
 a tool rack, disposed on the work platform, wherein the plurality of end effectors are placed on the tool rack.

3. The mobile robot according to claim 2, wherein the work platform is provided with a positioning member and configured for placing a material tray, so that the end effectors on the robotic hand is able to obtain materials from the material tray for assembly.

4. The mobile robot according to claim 1, wherein the robotic hand comprises:
 a multi-joint arm, disposed on the mobile platform to implement assembly actions in multiple directions; and
 a quick-change mechanism, connected to an end of the multi-joint arm and configured for quick-change connection with the plurality of end effectors.

5. The mobile robot according to claim 1, wherein the inspection apparatus comprises:
 a global camera, disposed on the mobile platform and configured to obtain assembly environment information;
 an end camera, disposed at an end of the robotic hand to obtain the assembly recipe signal; and
 a light source, disposed adjacent to the end camera to provide lighting for image capturing by the end camera.

6. The mobile robot according to claim 5, wherein the inspection apparatus further comprises a rangefinder, disposed on the mobile platform to obtain a precise position signal of the mobile platform.

7. The mobile robot according to claim 6, wherein the rangefinder is disposed in different orientations on the mobile platform; and/or, two rangefinders are disposed on each of the three sides of the mobile platform.

8. The mobile robot according to claim 1, wherein the plurality of end effectors comprise:
 a gripper mechanism, configured to grasp a plug to test the battery;
 a suction cup mechanism, configured to suction a material tray for material loading, or suction foam, or suction a label; and
 a screw-locking mechanism, configured to suction a bolt from the material tray located on the mobile platform for assembly.

9. A control method for assembling a battery, applied to a mobile robot, wherein the mobile robot comprises a mobile platform, an inspection apparatus, a plurality of end effectors, and a robotic hand, and the control method comprises:
 determining a target end effector from the plurality of end effectors based on an assembly instruction;
 controlling the robotic hand to connect to the target end effector; and
 based on a position signal and an assembly recipe signal obtained by the inspection apparatus, controlling the target end effector on the robotic hand to assemble the battery.

10. The control method according to claim 9, wherein the control method further comprises:
 determining a target auxiliary device from a plurality of auxiliary devices based on the assembly instruction; and
 based on a first position signal obtained by the inspection apparatus, controlling the mobile platform to move from an initial position to a position corresponding to the target auxiliary device.

11. The control method according to claim 10, wherein the control method further comprises:
 determining relative position information between the mobile robot and the target auxiliary device based on a second position signal obtained by the inspection apparatus, and storing the relative position information into a preset database.

12. The control method according to claim 9, wherein the controlling the robotic hand to connect to the target end effector comprises:
 determining a position of the target end effector based on a first image obtained by the inspection apparatus that contains the plurality of end effectors; and
 moving the robotic hand to the position of the target end effector to connect the robotic hand with the target end effector.

13. The control method according to claim 9, wherein the based on a position signal and an assembly recipe signal obtained by the inspection apparatus, controlling the target end effector on the robotic hand to assemble the battery comprises:
 determining an assembly procedure based on the assembly recipe signal obtained by the inspection apparatus; and
 according to the assembly procedure and based on the position signal obtained by the inspection apparatus, controlling the target end effector on the robotic hand to assemble the battery.

14. The control method according to claim 13, wherein in a case that the assembly procedure comprises a plugging procedure, the position signal comprises a position signal of a plug and a position signal of a socket, the target end effector comprises a gripper mechanism, and the assembly comprises testing; and the based on the position signal obtained by the inspection apparatus, controlling the target end effector on the robotic hand to assemble the battery comprises:
based on the position signal of the plug obtained by the inspection apparatus, controlling the gripper mechanism on the robotic hand to grasp the plug; and
based on the position signal of the socket obtained by the inspection apparatus, controlling the gripper mechanism on the robotic hand to insert the plug into the socket to perform a test on the battery.

15. The control method according to claim 14, wherein the control method further comprises:
controlling the gripper mechanism on the robotic hand to pull out the plug from the socket and move the plug to a set position in response to completion of the battery test.

16. The control method according to claim 13, wherein in a case that the assembly procedure comprises a screw-locking procedure, the position signal comprises a position signal of a bolt tray on the bolt feeder and a position signal of a bolt hole, and the target end effector comprises a suction cup mechanism and a screw-locking mechanism; and
the based on the position signal obtained by the inspection apparatus, controlling the target end effector on the robotic hand to assemble the battery comprises:
based on the position signal of the bolt tray obtained by the inspection apparatus, controlling the suction cup mechanism on the robotic hand to replace a material tray on the mobile platform with the bolt tray;
replacing the suction cup mechanism on the robotic hand with the screw-locking mechanism, and controlling the screw-locking mechanism on the robotic hand to suction a bolt from the bolt tray; and
based on the position signal of the bolt hole obtained by the inspection apparatus, controlling the screw-locking mechanism on the robotic hand to assemble the bolt into the bolt hole.

17. The control method according to claim 13, wherein in a case that the assembly procedure comprises a material pasting procedure, the position signal comprises a position signal of a target material in the target auxiliary device and a position signal of a pasting region, the target end effector comprises a suction cup mechanism, and the assembly comprises pasting; and
the based on the position signal obtained by the inspection apparatus, controlling the target end effector on the robotic hand to assemble the battery comprises:
based on the position signal of the target material obtained by the inspection apparatus, controlling the suction cup mechanism on the robotic hand to suction the target material; and
based on the position signal of the pasting region obtained by the inspection apparatus, controlling the suction cup mechanism on the robotic hand to paste the target material to the pasting region; wherein the target material comprises one of the following: foam and a label.

18. The control method according to claim 13, wherein the control method further comprises:
in response to completion of the assembly procedure of the battery, controlling the robotic hand to move to a position corresponding to the target end effector to separate the robotic hand from the target end effector; and
controlling the mobile platform to move to the initial position.

19. A control system for assembling a battery, applied to a mobile robot, wherein the mobile robot comprises a mobile platform, an inspection apparatus, a plurality of end effectors, and a robotic hand, and the control system comprises an upper-level computer and a plurality of controllers in communication connection with the upper-level computer, wherein
the upper-level computer is configured to receive an assembly instruction; based on the assembly instruction, determine a target controller from the plurality of controllers; and send the assembly instruction to the target controller; and
the target controller is configured to receive the assembly instruction; and based on a position signal and an assembly recipe signal obtained by the inspection apparatus, control a target end effector on the robotic hand to assemble the battery; wherein the target end effector is determined from the plurality of end effectors based on the assembly instruction.

20. The control system according to claim 19, wherein the target controller comprises at least one of the following: a motion control module, a positioning control module, and an anomaly detection module; and the inspection apparatus comprises a camera and a rangefinder, wherein:
the motion control module is configured to control movement of the mobile platform and/or the robotic hand based on a first position signal obtained by the rangefinder and/or a first image signal obtained by the camera;
the positioning control module is configured to determine position information of a target object based on a second image signal obtained by the camera; wherein the target object comprises at least one of the following: a plug, a socket, a bolt tray, a bolt hole, foam, a label, and a pasting region;
the anomaly detection module is configured to inspect a target action performed by the target end effector to obtain a detection result; wherein the target action comprises at least one of the following: grasping a plug, inserting a plug into a socket, pulling out a plug, screw-locking assembly, peeling foam, and peeling a label;
in a case that the target controller comprises a plugging controller, the target controller further comprises a compliance control module, wherein the compliance control module is configured to control compliance of the target end effector on the robotic hand;
in a case that the target controller comprises a screw-locking controller or a foam pasting controller, the target controller further comprises a range detection module, wherein the range detection module is configured to determine relative position information between the mobile robot and a target auxiliary device based on a second position signal obtained by the rangefinder; wherein the target auxiliary device is determined from a plurality of auxiliary devices based on the assembly instruction, the plurality of auxiliary devices comprise a bolt feeder, a foam peeler, and a label peeler; and
in a case that the target controller comprises a label pasting controller, the target controller further comprises a counting control module, wherein the counting control module is configured to count the number of times of label usage.

\* \* \* \* \*